United States Patent
Patchava et al.

(10) Patent No.: US 11,632,272 B1
(45) Date of Patent: Apr. 18, 2023

(54) MULTIPLEXING DEMODULATION REFERENCE SIGNAL AND DATA IN ORTHOGONAL TIME FREQUENCY SPACE WAVEFORM

(71) Applicant: QUALCOMM Incorporated, San Diego, CA (US)

(72) Inventors: Raviteja Patchava, San Diego, CA (US); Jun Ma, San Diego, CA (US); Morteza Soltani, San Diego, CA (US); Jing Sun, San Diego, CA (US); Xiaoxia Zhang, San Diego, CA (US); Zhifei Fan, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/706,026

(22) Filed: Mar. 28, 2022

(51) Int. Cl.
*H04L 25/02* (2006.01)
*H04L 27/26* (2006.01)
*H04J 13/00* (2011.01)

(52) U.S. Cl.
CPC ...... *H04L 25/0222* (2013.01); *H04J 13/0062* (2013.01); *H04L 27/2607* (2013.01); *H04L 27/2613* (2013.01); *H04L 27/26524* (2021.01)

(58) Field of Classification Search
CPC ............. H04L 25/0202; H04L 27/2657; H04L 27/2607; H04L 27/2613; H04L 27/2652; H04L 25/0222
USPC .......................................................... 375/316
See application file for complete search history.

(56) References Cited

U.S. PATENT DOCUMENTS

2019/0200249 A1* 6/2019 Yoon ..................... H04W 24/08
2022/0361254 A1* 11/2022 Ma ..................... H04W 74/0841

* cited by examiner

*Primary Examiner* — Emmanuel Bayard
(74) *Attorney, Agent, or Firm* — Holland & Hart LLP

(57) ABSTRACT

Methods, systems, and devices for wireless communications are described. A network entity may map a demodulation reference signal (DMRS), a truncated sequence, and data in a delay-Doppler domain in accordance with a control signal. The network entity may apply a Fourier transform on the mapped DMRS, the truncated sequence, and the data to generate a signal in the time domain. The network entity may output, and a user equipment (UE) may receive, the signal in the time domain, including the DMRS, the truncated sequence, and the data. The UE may apply a Fourier transform on the received signal in the time domain to generate a mapping of the DMRS and the data in the delay-Doppler domain. The UE may perform channel estimation based on applying the Fourier transform on the received signal.

30 Claims, 20 Drawing Sheets

US 11,632,272 B1

MULTIPLEXING DEMODULATION REFERENCE SIGNAL AND DATA IN ORTHOGONAL TIME FREQUENCY SPACE WAVEFORM

FIELD OF TECHNOLOGY

The present disclosure relates to wireless communications, including multiplexing demodulation reference signal (DMRS) and data in orthogonal time frequency space (OTFS) waveform.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support multiplexing demodulation reference signal (DMRS) and data in orthogonal time frequency space (OTFS) waveform. For example, a network entity may output, and a user equipment (UE) may receive, a control signal indicating a position of a DMRS and a sequence for the DMRS in a delay-Doppler domain. The network entity may map the DMRS, a truncated sequence, and data to the delay-Doppler domain in accordance with the control signal (e.g., to a two-dimensional delay-Doppler matrix). In some cases, the truncated sequence may include a number of last samples of the DMRS. The network entity may generate a signal in the time domain by applying a Fourier transform to the mapped DMRS, the truncated sequence, and the data. For instance, the network entity may convert the DMRS, the truncated sequence, and the data to the time-frequency domain using one or more precoders (e.g., one or more inverse scaled fast Fourier transform (ISFFT) and to the time domain using one or more precoders (e.g., one or more inverse fast Fourier transforms (IFFT)) to generate the signal in the time domain. The network entity may output the signal in the time domain to a UE over a downlink channel, and the UE may apply a Fourier transform to the signal in the time domain (e.g., may apply an inverse of the operations at the network entity) to generate the mapping in the delay-Doppler domain. In some examples, the network entity may include a cyclic prefix at the beginning of the signal in the time domain, where the cyclic prefix may include a copy of the truncated sequence. In some examples, the network entity may output an additional instance of the DMRS at a sequentially last position of the signal in the time domain, or in an extended cyclic prefix in the signal in the time domain. In some cases, the network entity may map the DMRS to a first position, the truncated sequence to a second position, and the data to a third position in the delay domain of the delay-Doppler domain.

A method for wireless communication at a user equipment (UE) is described. The method may include receiving a control signal indicating a position of a transmission of a DMRS and a sequence for the DMRS in a delay-Doppler domain, receiving a signal in time domain, the signal including the sequence for the DMRS, a truncated sequence, and data, applying a Fourier transform on the received signal in the time domain to generate a mapping of the DMRS and the data in the delay-Doppler domain, and performing a channel estimation based on applying the Fourier transform on the received signal.

An apparatus for wireless communication at a UE is described. The apparatus may include a processor, memory coupled with the processor, and instructions stored in the memory. The instructions may be executable by the processor to cause the apparatus to receive a control signal indicating a position of a transmission of a DMRS and a sequence for the DMRS in a delay-Doppler domain, receive a signal in time domain, the signal including the sequence for the DMRS, a truncated sequence, and data, apply a Fourier transform on the received signal in the time domain to generate a mapping of the DMRS and the data in the delay-Doppler domain, and perform a channel estimation based on applying the Fourier transform on the received signal.

Another apparatus for wireless communication at a UE is described. The apparatus may include means for receiving a control signal indicating a position of a transmission of a DMRS and a sequence for the DMRS in a delay-Doppler domain, means for receiving a signal in time domain, the signal including the sequence for the DMRS, a truncated sequence, and data, means for applying a Fourier transform on the received signal in the time domain to generate a mapping of the DMRS and the data in the delay-Doppler domain, and means for performing a channel estimation based on applying the Fourier transform on the received signal.

A non-transitory computer-readable medium storing code for wireless communication at a UE is described. The code may include instructions executable by a processor to receive a control signal indicating a position of a transmission of a DMRS and a sequence for the DMRS in a delay-Doppler domain, receive a signal in time domain, the signal including the sequence for the DMRS, a truncated sequence, and data, apply a Fourier transform on the received signal in the time domain to generate a mapping of the DMRS and the data in the delay-Doppler domain, and perform a channel estimation based on applying the Fourier transform on the received signal.

Some examples of the method, apparatuses, and non-transitory computer-readable medium described herein may further include operations, features, means, or instructions for identifying a mapping of the sequence for the DMRS and the truncated sequence to a continuous set of resources in a delay domain of the delay-Doppler domain for one or more consecutive Doppler values of the delay-Doppler domain, where performing the channel estimation may be based on identifying the mapping of the sequence for the DMRS and the truncated sequence, and where the DMRS and the truncated sequence include a non-zero value for at least one Doppler value of the one or more consecutive Doppler values.

Some examples of the method, apparatuses, and non-transitory computer-readable medium described herein may further include operations, features, means, or instructions for estimating a delay channel at one or more Doppler values of the delay-Doppler domain based on receiving the signal in the time domain, where performing the channel estimation may be based on estimating the delay channel.

Some examples of the method, apparatuses, and non-transitory computer-readable medium described herein may further include operations, features, means, or instructions for applying a threshold to the estimated delay channel to generate a Doppler domain channel and applying an IFFT on the Doppler domain channel, where performing the channel estimation may be based on applying the IFFT.

Some examples of the method, apparatuses, and non-transitory computer-readable medium described herein may further include operations, features, means, or instructions for identifying a mapping of the sequence for the DMRS to a first position corresponding to a first set of consecutive delay values in a delay domain of the delay-Doppler domain for one or more Doppler values of the delay-Doppler domain and identifying a mapping of the truncated sequence to a second position corresponding to a second set of consecutive delay values in the delay domain of the delay-Doppler domain for the one or more Doppler values of the delay-Doppler domain, where performing the channel estimation may be based on identifying the mapping of the sequence for the DMRS and the truncated sequence.

In some examples of the method, apparatuses, and non-transitory computer-readable medium described herein, the first position follows the second position based on a circular association between a set of multiple positions in the delay domain of the delay-Doppler domain.

In some examples of the method, apparatuses, and non-transitory computer-readable medium described herein, the second position follows the first position based on a circular association between a set of multiple positions in the delay domain of the delay-Doppler domain.

Some examples of the method, apparatuses, and non-transitory computer-readable medium described herein may further include operations, features, means, or instructions for identifying a mapping of the data to a third position in the delay domain of the delay-Doppler domain, where the third position may be different from the first position and the second position.

Some examples of the method, apparatuses, and non-transitory computer-readable medium described herein may further include operations, features, means, or instructions for transmitting a capability to support reception of the sequence for the DMRS at a sequentially last position of the signal in the time domain or included in an extended cyclic prefix.

In some examples of the method, apparatuses, and non-transitory computer-readable medium described herein, a length of the sequence for the DMRS in a delay domain of the delay-Doppler domain may be based on a maximum delay spread and a bandwidth.

In some examples of the method, apparatuses, and non-transitory computer-readable medium described herein, a length of the sequence for the DMRS in a Doppler domain of the delay-Doppler domain may be based on a maximum Doppler value and a total duration of an orthogonal time frequency and space waveform.

In some examples of the method, apparatuses, and non-transitory computer-readable medium described herein, the sequence for the DMRS includes a set of input samples and the truncated sequence includes a subset of the set of input samples.

In some examples of the method, apparatuses, and non-transitory computer-readable medium described herein, the sequence for the DMRS and the truncated sequence include Zadoff-Chu sequences.

A method for wireless communication at a network entity is described. The method may include outputting a control signal indicating a position of a DMRS transmission and a sequence for the DMRS in a delay-Doppler domain, mapping the DMRS, a truncated sequence and data in the delay-Doppler domain in accordance with the control signal, applying a Fourier transform on the mapped DMRS, the truncated sequence and the data to generate a signal in time domain, and outputting the signal in the time domain, the signal including the sequence for the DMRS, the truncated sequence, and the data.

An apparatus for wireless communication at a network entity is described. The apparatus may include a processor, memory coupled with the processor, and instructions stored in the memory. The instructions may be executable by the processor to cause the apparatus to output a control signal indicating a position of a DMRS transmission and a sequence for the DMRS in a delay-Doppler domain, map the DMRS, a truncated sequence and data in the delay-Doppler domain in accordance with the control signal, apply a Fourier transform on the mapped DMRS, the truncated sequence and the data to generate a signal in time domain, and output the signal in the time domain, the signal including the sequence for the DMRS, the truncated sequence, and the data.

Another apparatus for wireless communication at a network entity is described. The apparatus may include means for outputting a control signal indicating a position of a DMRS transmission and a sequence for the DMRS in a delay-Doppler domain, means for mapping the DMRS, a truncated sequence and data in the delay-Doppler domain in accordance with the control signal, means for applying a Fourier transform on the mapped DMRS, the truncated sequence and the data to generate a signal in time domain, and means for outputting the signal in the time domain, the signal including the sequence for the DMRS, the truncated sequence, and the data.

A non-transitory computer-readable medium storing code for wireless communication at a network entity is described. The code may include instructions executable by a processor to output a control signal indicating a position of a DMRS transmission and a sequence for the DMRS in a delay-Doppler domain, map the DMRS, a truncated sequence and data in the delay-Doppler domain in accordance with the control signal, apply a Fourier transform on the mapped DMRS, the truncated sequence and the data to generate a signal in time domain, and output the signal in the time domain, the signal including the sequence for the DMRS, the truncated sequence, and the data.

Some examples of the method, apparatuses, and non-transitory computer-readable medium described herein may further include operations, features, means, or instructions for mapping the sequence for the DMRS and the truncated sequence to a continuous set of resources in a delay domain of the delay-Doppler domain for one or more consecutive Doppler values of the delay-Doppler domain, where applying the Fourier transform may be based on mapping the sequence for the DMRS and the truncated sequence, and where the DMRS and the truncated sequence include a non-zero value for at least one Doppler value of the one or more consecutive Doppler values.

Some examples of the method, apparatuses, and non-transitory computer-readable medium described herein may further include operations, features, means, or instructions for determining the sequence for the DMRS based on an operating modulation and coding scheme and a signal to noise ratio value.

In some examples of the method, apparatuses, and non-transitory computer-readable medium described herein, outputting the signal may include operations, features, means, or instructions for outputting the sequence for the DMRS at a sequentially last position of the signal in the time domain.

In some examples of the method, apparatuses, and non-transitory computer-readable medium described herein, outputting the signal may include operations, features, means, or instructions for outputting the truncated sequence and the sequence for the DMRS included in an extended cyclic prefix of the signal in the time domain.

Some examples of the method, apparatuses, and non-transitory computer-readable medium described herein may further include operations, features, means, or instructions for mapping the sequence for the DMRS to a first position corresponding to a first set of consecutive delay values in a delay domain of the delay-Doppler domain for one or more Doppler values of the delay-Doppler domain and mapping the truncated sequence to a second position corresponding to a second set of consecutive delay values in the delay domain of the delay-Doppler domain for the one or more Doppler values of the delay-Doppler domain, where applying the Fourier transform may be based on mapping the sequence for the DMRS and the truncated sequence.

In some examples of the method, apparatuses, and non-transitory computer-readable medium described herein, the first position follows the second position based on a circular association between a set of multiple positions in the delay domain of the delay-Doppler domain.

In some examples of the method, apparatuses, and non-transitory computer-readable medium described herein, the second position follows the first position based on a circular association between a set of multiple positions in the delay domain of the delay-Doppler domain.

Some examples of the method, apparatuses, and non-transitory computer-readable medium described herein may further include operations, features, means, or instructions for mapping the data to a third position in the delay domain of the delay-Doppler domain, where the third position may be different from the first position and the second position.

Some examples of the method, apparatuses, and non-transitory computer-readable medium described herein may further include operations, features, means, or instructions for obtaining a capability to support reception of the sequence for the DMRS at a sequentially last position of the signal in the time domain or included in an extended cyclic prefix, where the mapping may be based on obtaining the capability.

In some examples of the method, apparatuses, and non-transitory computer-readable medium described herein, a length of the sequence for the DMRS in a delay domain of the delay-Doppler domain may be based on a maximum delay spread and a bandwidth.

In some examples of the method, apparatuses, and non-transitory computer-readable medium described herein, a length of the sequence for the DMRS in a Doppler domain of the delay-Doppler domain may be based on a maximum Doppler value and a total duration of an orthogonal time frequency and space waveform.

In some examples of the method, apparatuses, and non-transitory computer-readable medium described herein, the sequence for the DMRS includes a set of input samples and the truncated sequence includes a subset of the set of input samples.

In some examples of the method, apparatuses, and non-transitory computer-readable medium described herein, the sequence for the DMRS and the truncated sequence include Zadoff-Chu sequences.

DETAILED DESCRIPTION

Figure 1:
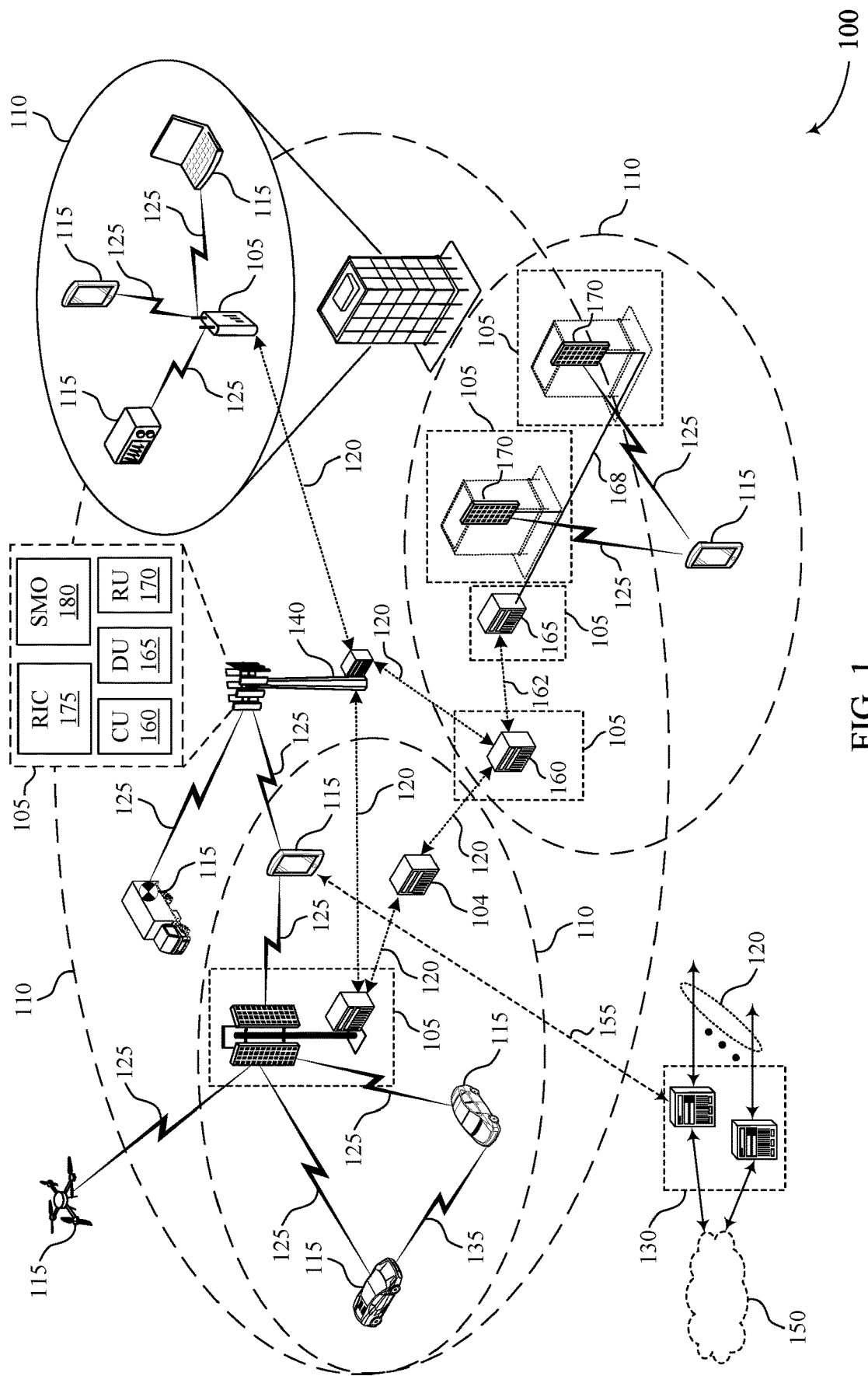
FIG. 1 illustrates an example of a wireless communications system that supports multiplexing demodulation reference signal (DMRS) and data in orthogonal time frequency space (OTFS) waveform in accordance with one or more aspects of the present disclosure.

Wireless communication systems may support data modulation for transmissions. In channels having a high Doppler spread, a network entity may modulate data according to orthogonal time frequency space (OTFS) modulation. In some examples, a network entity may transmit a reference signal to a user equipment (UE) using OTFS modulation. For example, a network entity may map information samples for the reference signal to a two-dimensional delay-Doppler matrix. The network entity may obtain a time domain signal from the delay-Doppler mapping using one or more precoders and other processes (e.g., an inverse fast Fourier transform (IFFT), an inverse scaled fast Fourier transform (ISFFT), a discrete Fourier transform (DFT), or a combination thereof). The network entity may then transmit the time domain signal including the reference signal to the UE. In some cases, when transmitting a demodulation reference signal (DMRS), a network entity may map the DMRS based on a single pilot sequence to the delay-Doppler domain. However, transmitting a single pilot based DMRS using OTFS may use a high amount of power for accurate channel estimation, which may result in a high peak to average power ratio (PAPR) for communications, leading to greater power loss.

Techniques described herein may support reducing PAPR in DMRS communications by multiplexing DMRSs with data in OTFS modulation. For example, a network entity may multiplex a DMRS sequence (e.g., a Zadoff-Chu sequence) with data and may map the DMRS and the data to the delay-Doppler domain (e.g., to a two-dimensional delay-Doppler matrix). The network entity may also map a truncated sequence (e.g., a truncated DMRS sequence) including a reduced number of samples from the DMRS sequence to the delay-Doppler domain. The network entity may convert the DMRS, the truncated DMRS, and the data to the time domain using one or more precoders (e.g., an IFFT), and may generate a time domain signal. The network entity may transmit the time domain signal to a UE over a downlink channel, and the UE may decode the received signal using one or more FFTs and one or more mathematical operations (e.g., applying a comparison to a threshold or circular convolution). In some cases, the time domain signal may include one or more symbols in succession, where the time domain signal may include a copy of the DMRS sequence, the truncated DMRS sequence, and the data. In some examples, the network entity may include a cyclic prefix at the beginning of the time domain signal, where the cyclic prefix may include a copy of the truncated DMRS sequence. In some examples, the network entity may map the truncated DMRS sequence followed by the DMRS sequence before the data in the delay domain. In some cases, the network entity may map the DMRS sequence before the data, and may map the truncated DMRS sequence after the data in the delay domain. In some examples, after converting the message to the time domain, where the message in the time domain includes the DMRS sequence followed by the data and the truncated DMRS sequence in each symbol, the network entity may include additional instances of the DMRS sequence at the end of the time domain signal. In some examples, the network entity may map the truncated DMRS sequence and the DMRS sequence after the data in the delay domain, and may include an additional instance of the DMRS sequence in the cyclic prefix, where the DMRS sequence may follow the truncated DMRS sequence in the cyclic prefix.

Aspects of the disclosure are initially described in the context of wireless communications systems. Aspects of the disclosure are further illustrated by and described with reference to wireless communications systems, signal generation processes, and process flows. Aspects of the disclosure are further illustrated by and described with reference to apparatus diagrams, system diagrams, and flowcharts that relate to multiplexing DMRS and data in OTFS waveform.

FIG. 1 illustrates an example of a wireless communications system 100 that supports multiplexing DMRS and data in OTFS waveform in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support multiplexing DMRS and data in OTFS waveform as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported DFT size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands, such as the 5 GHz band, the 2.4 GHz band, the 60 GHz band, the 3.6 GHz band, and/or the 900 MHz band. The unlicensed spectrum may also include other frequency bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Wireless communications system 100 may include channels supporting multipath propagation when transmitting data. For example, a transmitting device (e.g., a network entity 105) may send a signal using one or more different paths due to various causes, including atmospheric ducting, where radio signals are guided by layers of the atmosphere due to refractive index gradients, ionospheric reflection and refraction, reflection from water or physical objects, or any combination thereof. In some examples, multipath propagation may produce distortion in the signal. For example, a receiving device (e.g., a UE 115) may receive multiple copies of the same signal phase shifted from each other. Additionally, or alternatively, the copies of the signal may interfere with either in constructive or destructive interference. In some examples, destructive interference may cause fading or weaking of the signal strength (e.g., may cause a lower receive power at the receiving device for the signal). In some examples, movement of a transmitting device or a receiving device during transmissions or reception of signals may cause additional distortion, such as Doppler spread, where a spectrum of a narrow-band signal may be widened. In some examples, distortion caused by multipath propagation may otherwise negatively impact quality of communications. For example, high Doppler spread may increase fading of a signal.

In some examples, the wireless communications system 100 may use OTFS modulation to mitigate high Doppler spread. In particular, a network entity 105 may use OTFS waveform to handle communications on channels having high Doppler spread by transmitting information symbols in a delay-Doppler domain rather than a time-frequency domain. For example, a network entity 105 may map information samples to the delay-Doppler domain by mapping the samples to a two-dimensional delay-Doppler matrix or grid. The network entity 105 (e.g., transmitting device) may convert the delay-Doppler matrix to the time-frequency domain using one or more precoders (e.g., an IFFT, an ISFFT, a DFT, or any combination thereof). The network entity 105 may then convert the matrix to the time domain using one or more precoders (e.g., an IFFT), and may transmit a time domain signal generated through the conversion to a UE 115, which may decode the time domain signal using one or more decoders, coders, or mathematical processes.

In some examples, the OTFS modulation described herein may include application of a precoder on N consecutive OFDM symbols. For example, the delay-Doppler matrix or grid may be represented using x[k, l], where l and k may represent the delay and Doppler axes of the delay-Doppler domain, or a number of delay and Doppler taps, respectively. A network entity 105 may map N symbols to the delay-Doppler matrix or grid using Equation 1, where N may represent a number of consecutive OFDM symbols. The delay-Doppler matrix may have a size N×M, where M may represent a number of subcarriers for transmission (e.g., a number of frequency resources for the transmission). The network entity 105 may then use a precoder, such as an ISFFT, to convert the delay-Doppler matrix to a time-frequency matrix in the time-frequency domain. In some examples, the ISFFT may represent an example of a 2-dimensional FFT, where applying the ISFFT may include applying one or more IFFTs to the Doppler axis of the delay-Doppler matrix, and applying one or more FFTs to the delay axis of the delay-Doppler matrix. In some examples, the network entity 105 may calculate the ISFFT according to Equation 1:

$$X[n, m] = \frac{1}{\sqrt{NM}} \sum_{k=0}^{N-1} \sum_{l=0}^{M-1} x[k, l] e^{j2\pi\left(\frac{nk}{N} - \frac{ml}{M}\right)} \quad (1)$$

The time-frequency matrix generated from the delay-Doppler matrix may be described as X[n,m], where n and m may represent the time and frequency axes, respectively, and may have a size of N×M. In some examples, applying the ISFFT may including processing the information symbols such that each information symbol occupies an available time and bandwidth.

In some examples, the network entity 105 may generate a time domain signal s(t) in accordance with a time-frequency matrix and an OFDM modulator. The network entity 105 may transmit the time domain signal s(t) using a channel H(t, f). In some examples, a receiving device (e.g., UE 115) may receive a time domain signal r(t), where the received signal r(t) may differ from the transmitted signal s(t) in one or more characteristics, including power, frequency shift, or other properties based on the channel (e.g., as a result of multipath interference as described herein). The UE 115 may process the received signal r(t) using an OFDM demodulator to generate a time-frequency matrix Y[n, m]. The UE 115 may apply a decoder based on a scaled fast Fourier transform (SFFT), along with one or more mathematical processes and other operations to convert the time frequency matrix Y[n, m] to the delay-Doppler domain in the form of an estimated delay-Doppler matrix y[k, l]. In some examples, OTFS modulation as described herein may present different advantages over OFDM modulation by mitigating high Doppler spread, as well as having constant fading and higher multi-path diversity due to transmitting information samples mapped in the delay-Doppler domain rather than the time-frequency domain.

In some examples, a relation between the input and the output of the OTFS modulation as described herein, may include a two-dimensional circular convolution with varying phase shifts. For example, the input signal of the OTFS modulation may be represented as x[k, l] and the output signal may be represented as y[k, l]. In some examples, the channel may be represented as h[k, l]. In some examples, a device (e.g., network entity 105 or UE 115) may calculate the relation between the input and the output of the OTFS modulation according to Equation 2:

$$X[n, m] = \frac{1}{\sqrt{NM}} \sum_{k=0}^{N-1} \sum_{l=0}^{M-1} x[k, l] e^{j2\pi\left(\frac{nk}{N} - \frac{ml}{M}\right)} \quad (2)$$

where:

$$\alpha_i(k, l) = \begin{cases} 1 & l_{\tau_i} \le l \le M \\ e^{-j2\pi\left(\frac{[k-k_{v_i}]_N}{N}\right)\frac{k_{v_i}}{N}} & 0 \le l \le l_{\tau_i} \end{cases}$$

In some examples, $$e^{j2\pi\left(\frac{l-l_{\tau_i}}{M}\right)\frac{k_{v_i}}{N}} \alpha_i(k,l)$$

may represent effects of inter carrier interference and inter symbol interference, and P may represent a number of delay-Doppler paths. In some examples, $h_i$ may represent a fade coefficient, and $l_{\tau_i}$ and $k_{v_i}$ may represent delay and Doppler taps at each summation value i, respectively. In some examples, due to an under-spread nature of the channel, the channel h[k, l] may occupy a small fraction of the delay-Doppler matrix near the origin of the delay-Doppler matrix.

In wireless communications systems supporting OTFS waveforms, a network entity 105 may map information samples to a two-dimensional grid (delay-Doppler) and may then process the mapped samples using a precoder to convert the information samples to the time-frequency domain. In some examples, a network entity 105 may transmit DMRSs using OTFS modulation. For example, a network entity 105 may map a single pilot based DMRS to the delay-Doppler domain, and may convert the single pilot based DMRS into a time domain signal using the techniques described herein. In some examples, a single pilot based DMRS may represent a DMRS with a single value or a single sample placed in the delay-Doppler domain, where a guard interval may surround the single value or single sample. However, accurate channel estimation using a single pilot based DMRS transmitted using OTFS may increase power usage (due to the single pilot based DMRS including a single value for the DMRS). High power usage may thus result in high PAPR for communications and may cause inefficiency in communications and poor battery life in devices.

As described herein, the wireless communications system 100 may support different techniques for multiplexing DMRS sequences with data in OTFS waveforms without increasing PAPR in communications. For example, a network entity 105 may multiplex a DMRS sequence (e.g., a Zadoff-Chu sequence) with data by placing the DMRS sequence, a truncated sequence (e.g., a truncated DMRS sequence), and the data in a two-dimensional delay-Doppler matrix. In some examples, the truncated sequence may include a subset of last samples of the DMRS sequence. The network entity 105 may convert the DMRS sequence, the truncated sequence, and the data to the time-delay domain using one or more precoders (e.g., IFFTs) to transmit the DMRS sequence, the truncated sequence, and the data across multiple time symbols (e.g., across N symbols). The network entity 105 may then convert the DMRS sequence, the truncated sequence, and the data to the time-frequency domain using one or more processes (e.g., DFTs) and to the time domain using one or more other precoders (e.g., IFFTs) to generate a time domain signal (e.g., an OTFS waveform in the time domain). In some examples, the conversion process from the delay-Doppler domain to the time-frequency domain may represent the application of one or more ISFFTs as described herein. The network entity 105 may transmit the time domain signal to a UE 115 over a downlink channel, and the UE 115 may decode the message by applying one or more mathematical operations or other processes as described in further detail with reference to FIG. 2. In some cases, the network entity 105 may add an additional copy of the DMRS to a cyclic prefix or to the end of the time domain message as described in further detail with reference to FIGS. 5 and 6. In some examples, the UE may use the DMRS sequence multiplexed with the data in the delay-Doppler domain to accurately estimate a delay-Doppler channel for the transmission.

In some examples, the network entity 105 may convert the delay-Doppler matrix to a waveform including a guard-interval. For example, the time domain signal may include a copy of the truncated sequence as a cyclic prefix at the beginning of a time domain signal, and each symbol of the time domain signal may include a copy of a DMRS sequence, data, and the truncated sequence, where the truncated sequence may act as a guard interval in each symbol. In some examples, the network entity 105 may arrange the DMRS sequence, the truncated sequence, and the data in the delay-Doppler matrix according to different configurations as described in further detail with reference to FIGS. 4-6. For example, the network entity 105 may map the truncated sequence before the DMRS sequence in the delay domain and may map the data after the truncated sequence and the DMRS sequence in the delay domain. In some cases, the network entity 105 may map the DMRS sequence, the truncated sequence, and the data according to any other configuration. In some examples, the mapping may include the truncated sequence immediately following the data in the delay domain to protect the DMRS sequence from interference from the data. In some examples, multiplexing the DMRS sequence with the data in an OTFS waveform may reduce the PAPR for communications and may allow the UE to perform accurate channel estimation of a delay-Doppler channel.

Figure 2:
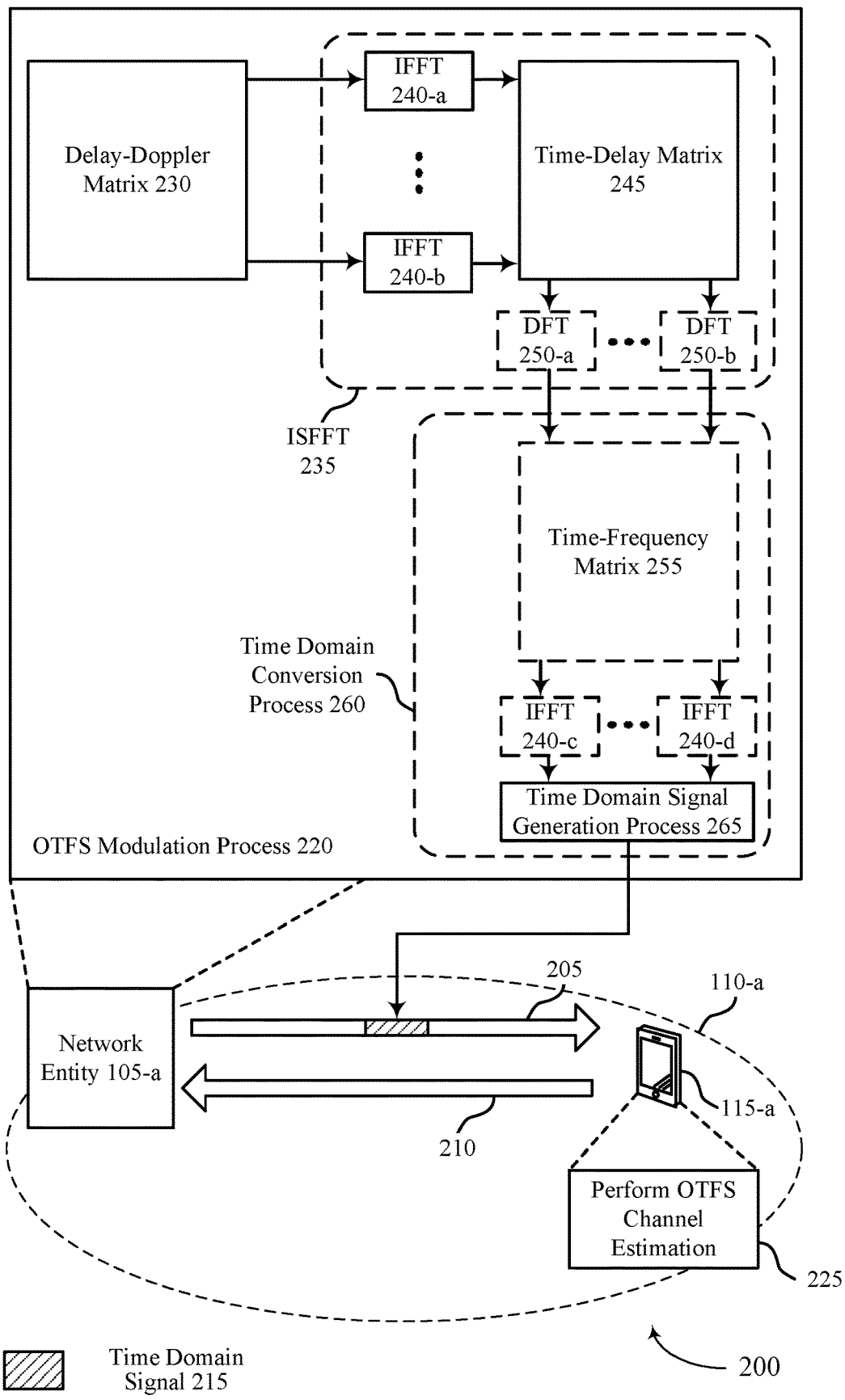
FIG. 2 illustrates an example of a wireless communications system that supports multiplexing DMRS and data in OTFS waveform in accordance with one or more aspects of the present disclosure.

FIG. 2 illustrates an example of a wireless communications system 200 that supports multiplexing DMRS and data in OTFS waveform in accordance with one or more aspects of the present disclosure. In some examples, the wireless communications system 200 may implement, or be implemented by, aspects of the wireless communications system 100. The wireless communications system 200 may include a network entity 105-a with a coverage area 110-a and a UE-115-a, which may represent examples of the network entities 105 with coverage areas 110 and the UEs 115 described with reference to FIG. 1. In some examples, the network entity 105-a may transmit control information, data, or both to the UE 115-a using a downlink communication link 205. Similarly, the UE 115-a may transmit control information, data, or both to the network entity 105-a using an uplink communication link 210. In some examples, the network entity 105-a may generate a time domain signal 215 using an OTFS modulation process 220 and may send the time domain signal 215 to the UE 115-a via the downlink communication link 205 for performing OTFS channel estimation at 225.

In some examples, the OTFS modulation process 220 may include mapping one or more information samples to the delay-Doppler domain by placing the one or more information samples in a delay-Doppler matrix 230. For example, the network entity 105-a may place one or more quadrature amplitude modulation (QAM) symbols into the delay-Doppler matrix 230, where the one or more QAM symbols may include data, control information, or any other information. In some examples, the delay-Doppler matrix 230 may represent a Q-QAM matrix of size M'×N', where M' and N' may represent the size of the delay and Doppler axes, respectively, and where the first Q in Q-QAM may represent a QAM alphabet size Q configured for the delay-Doppler matrix 230. In some examples, the QAM alphabet size Q may be a complex number. In some examples, the delay-Doppler matrix 230 may include up to M'N' log$_2$(Q) bits of information, where each bit of information may represent either a logic 0 or a logic 1. For example, the delay-Doppler matrix 230 may represent a 16-QAM matrix with a delay axis of 50 delay taps and a Doppler axis of 10 Doppler taps, and the network entity 105-a may place up to (50)(10) log$_2$ (16)=2000 bits of information in the delay-Doppler matrix 230.

In some examples, the OTFS modulation process 220 may include a conversion of the delay-Doppler matrix 230 to the time-frequency domain using one or more precoders. For example, the network entity 105-a may use ISFFT 235 to convert the delay-Doppler matrix 230 to the time-frequency domain, where applying the ISFFT 235 may include applying one or more IFFTs 240, a time-delay matrix 245, and one or more DFTs 250. In some examples, the network entity 105-a may process the information symbols in the delay-Doppler matrix 230 using IFFT 240-a through IFFT 240-b to generate the time-delay matrix 245. In some cases, the IFFT 240-a through the IFFT 240-b may include M' IFFTs corresponding to each row in the delay axis of the delay-Doppler matrix 230. In some examples, the time-delay matrix 245 may represent a matrix of size M"×N", where M" and N" may represent the size of the delay and time axes, respectively. In some examples, M" and N" may be the same size as M' and N' of the delay-Doppler matrix 230. In some cases, M" and N" may be a different size than M' and N' of the delay-Doppler matrix 230. In some examples, the network entity 105-a may process the information symbols in the time-delay matrix 245 using DFT 250-a through DFT 250-b to generate a time-frequency matrix 255. In some examples, the DFT 250-a through the DFT 250-b may include N" DFTs corresponding to each column in the time axis of the time-delay matrix 245.

In some examples, the OTFS modulation process 220 may include a time domain conversion process 260. For example, the time domain conversion process 260 may include the time-frequency matrix 255, one or more IFFTs 240, and time domain signal generation process 265. In some cases, the time-frequency matrix 255 may represent a matrix of size M×N, where M and N may represent the size of the frequency and time axes, respectively. In some examples, M and N may be the same size as M' and N' of the delay-Doppler matrix 230, or the same size as M" and N" of the time-delay matrix 245. In some cases, M and N may be of different sizes than M' and N', or M" and N". In some examples, M may correspond to a number of subcarriers for transmitting the time domain signal 215, a number of samples for each symbol in the time domain signal 215, or both. In some cases, N may correspond to a number of symbols for the time domain signal 215. In some examples, the network entity 105-a may determine the number of symbols N based on a minimum value, where the minimum value may be a geometric coherence time value or a latency value. For example, the network entity 105-a may select N based on a geometric coherence time value if the geometric time value is less than a latency value. In some examples, a geometric coherence time value may represent a time duration during which scatter values and Doppler values remain constant, and may depend on various parameters of a device in communication with the network entity 105-a, including velocity, angle of arrival (AoA), and angle of departure (AoD).

In some examples, the network entity 105-a may process the information symbols in the time-frequency matrix 255 using IFFT 240-c through IFFT 240-d to convert the time-frequency matrix 255 to the time domain. In some cases, the IFFT 240-c through the IFFT 240-d may include N IFFTs corresponding to each column in the time axis of the time-frequency matrix 255. In some examples, the network entity 105-*a* may perform a time domain signal generation process 265 using the output of the IFFT 240-*c* through the IFFT 240-*d* to generate the time domain signal 215. In some examples, the time domain signal generation process 265 may include a parallel to serial conversion of the output of the IFFT 240-*c* through the IFFT 240-*d*. For example, the network entity 105-*a* may read the processed columns sequentially to generate a sequence of symbols and include the symbols in the time domain signal 215. In some examples, each column of the time-frequency matrix 255 may correspond to a respective symbol. In some examples, the time domain signal generation process 265 may include adding a cyclic prefix to the beginning of the time domain signal 215. The network entity may transmit the time domain signal 215 to the UE 115-*a* over the downlink communication link 205 after generating the time domain signal 215 using the time domain signal generation process 265. In some examples, the time domain conversion process 260 may represent or include an OFDM modulator as described with reference to FIG. 1.

As described herein, multiplexing DMRS with data in the OTFS modulation process 220 may reduce PAPR in communications. For example, the network entity 105-*a* may multiplex a DMRS sequence with data, and may map the DMRS sequence, a truncated sequence, and the data to the delay-Doppler matrix 230. In some examples, the DMRS sequence may have a length of samples L and the truncated sequence may have a length of samples $l_\tau$, and may represent a truncated number of last samples of the DMRS sequence as described with reference to FIG. 1. The network entity may then convert the delay-Doppler matrix 230 to the time domain by applying the ISFFT 235 and the time domain conversion process 260. In some examples, applying the ISFFT may include mapping the DMRS sequence, the truncated sequence, and the data to create a sequence of repeating symbols in the time-delay domain. In some examples, the network entity 105-*a* may arrange the DMRS sequence, the truncated sequence, and the data in the delay-Doppler matrix 230 according to different configuration as described in further detail with reference to FIGS. 4-6.

In some examples, the DMRS sequence may represent any sequence having correlation properties greater than a threshold. For example, the DMRS sequence may represent a Zadoff-Chu sequence, a pseudo-random noise sequence, Gold sequence, or other sequences. In some examples, the network entity 105-*a* may select the length L of the DMRS sequence based on different channel characteristics. For example, the network entity 105-*a* may select the length of the DMRS sequence L based on operating modulation and coding scheme value or signal to noise ratio values. In some examples, a modulation and coding scheme value may represent a modulation and coding scheme index, and may be based on a modulation type, coding rate, number of spatial streams, channel width, guard interval, or other channel characteristics. In some examples, the network entity 105-*a* may select a longer DMRS sequence length L to increase accuracy of channel estimation at the UE 115-*a*. In some examples, the network entity 105-*a* may select a longer DMRS sequence length Ls in the case of a high modulation and coding scheme value. In some examples, the selection of the DMRS sequence length L may be based on a delay spread and a Doppler spread of a channel.

In some examples, the UE 115-*a* may receive the time domain signal 215 and may perform an OTFS demodulation process, which may involve an inverse of the OTFS modulation process 220. For example, the UE 115-*a* may remove the cyclic prefix from the time domain signal 215, and may perform a parallel to serial conversion and one or more FFTs to the time domain signal 215 to generate a time-frequency matrix. In some examples, the parallel to serial conversion and application of the one or more FFTs may represent an OFDM demodulator as described with reference to FIG. 1. In some examples, the UE 115-*a* may perform an SFFT to convert the time-frequency matrix into a delay-Doppler matrix, where the SFFT may represent an example of the decoder as described with reference to FIG. 1. In some examples, the UE 115-*a* may perform the described demodulation process on any OTFS waveform received in the time domain, such as a time domain signal including a DMRS sequence as described herein or a different time domain signal not including a DMRS sequence.

In some examples, the OTFS modulation process 220 may be simplified to include less steps. For example, the network entity 105-*a* may refrain from performing the DFTs 250 in the ISFFT 235, the conversion process to the time-frequency domain, and the following IFFTs 240, if the DFTs 250 in the ISFFT 235 and the IFFTs 240 in the time domain conversion process 260 match. In some examples, the DFT 250-*a* through the DFT 250-*b* in the ISFFT 235 may match (e.g., may be the inverse of) corresponding IFFTs 240 (e.g., the IFFT 240-*c* through the IFFT 240-*d*) due to a same number of rows and columns. For example, the number of symbols and DFTs 250 N" may be equal to the number of symbols and IFFTs 240 N. Thus, the network entity 105-*a* may convert the delay-Doppler matrix 230 into the time domain using a simpler process (consuming less resources). For example, the time domain conversion may include converting the delay-Doppler matrix 230 into the time-delay matrix 245 using the IFFT 240-*a* through the IFFT 240-*b* across the rows of the delay-Doppler matrix 230, and generating the time domain signal 215 using the time domain signal generation process 265 including a parallel to serial conversion of the columns of the time-delay matrix 245. In some examples, the network entity 105-*a* may add a cyclic prefix to the beginning of the time domain signal 215 using the time domain signal generation process 265. In some examples, the simplified OTFS modulation process 220 described herein may represent an example of an inverse Zak transform, where an inverse Zak transform may transform a two-dimensional matrix to a one-dimensional signal.

The OTFS demodulation process described herein may similarly be simplified. For example, the UE 115-*a* may receive the time domain signal 215 over a time varying channel h(t, τ), where the time domain signal 215 may include N symbols, with M samples in each symbol, and a cyclic prefix. The UE 115-*a* may remove the cyclic prefix from the time domain signal 215, and may perform a serial to parallel process to generate a two-dimensional time-delay matrix. The UE 115-*a* may then apply N FFTs to respective rows of the two-dimensional time-delay matrix to generate a delay-Doppler matrix $y_{M \times N}$ of size M×N, where M and N may represent the size of the delay and Doppler axes, respectively. In some examples, the simplified OTFS demodulation process described herein may represent an example of a Zak transform, where a Zak transform may transform a one-dimensional signal to a two-dimensional matrix.

The UE 115-*a* may receive a control signal indicating a position of a transmission of a DMRS and a sequence for the DMRS in a delay-Doppler domain. Additionally, the UE 115-*a* may receive a signal (e.g., the time domain signal 215)

in time domain, the signal including the sequence for the DMRS, a truncated sequence, and data. In some examples, the UE 115-*a* may perform OTFS channel estimation at 225 after receiving the time domain signal 215 from the network entity 105-*a* with the DMRS sequence. The UE 115-*a* may apply a Fourier transform on the received time domain signal 215 to generate a mapping of the DMRS and the data in the delay-Doppler domain. In particular, the UE 115-*a* may identify a mapping of the sequence for the DMRS and the truncated sequence to a continuous set of resources in a delay domain of the delay-Doppler domain. For example, the UE 115-*a* may apply one or more FFTs across the time domain to the time domain signal 215 to generate a delay-Doppler domain matrix $y_{signal}$ (e.g., in a simplified conversion process as described herein), which may include a row y of repeated copies of the DMRS sequence. In some examples, the row y may represent a two-dimensional circular convolution of the delay-Doppler channel h and the DMRS sequence. In some cases, the DMRS sequence may represent x, and the domain signal y may thus represent the equation: $y = h \otimes x$. In some examples, the UE 115-*a* may apply the circular convolution according to Equation 3:

$$y(l_\tau + L, i) = \text{circ}(ZC)\hat{h}(1:l_v, i) + \text{noise},$$

$$\forall 0 \leq i \leq N-1 \quad (3)$$

The UE 115-*a* may estimate a delay channel at one or more Doppler values of the delay-Doppler domain based on receiving the time domain signal 215. In some examples, the UE 115-*a* may compute $y(l_\tau + 1: l_\tau + L, i)$ with less complexity using the one or more FFTs. In some examples, $\hat{h}$ may represent the delay channel at Doppler value i. In some cases, the UE 115-*a* may calculate h according to Equation 4:

$$\hat{h}(1: l_v, i) = \text{circ}(ZC)^{-1} y(l_\tau + 1: l_\tau + L, i) + \text{noise},$$

$$\forall 0 \leq i \leq N-1 \quad (4)$$

In some examples, the UE 115-*a* may apply a threshold on the estimated channel h. (e.g., estimated delay channel) to generate a Doppler domain channel. The threshold may be three sigma to reduce noise (up to 99.7%). For example, the UE 115-*a* may assume a signal represents noise if $\hat{h}(j, i) < \text{threshold}_{noise}$, where $\text{threshold}_{noise}$ may represent a threshold value for noise, and may thus set $\hat{h}(j, i) = 0$. However, if $\hat{h}(j, i) > \text{threshold}_{noise}$, then the UE 115-*a* may assume that $\hat{h}$ represents a valid channel. In some examples, the UE 115-*a* may apply one or more IFFTs across the Doppler domain of the channel h to convert the channel to a time-delay channel representing a time-delay domain response. For example, the UE 115-*a* may apply one or more IFFTs represented by $\text{IFFT}\{\hat{h}(j, 1: N)\}$ to $\hat{h}$ for $\hat{h}_{\tau, t}(j, 1:N)$, $\forall 1 < j < \tau_{max}$. In some examples, $\hat{h}_{\tau, t}(j, 1:N)$ may represent the channel gain at delay j at time instants 1, 1+M, 1+2M, . . . , 1+(N−1)M. In some examples, the UE 115-*a* may perform one or more interpolation processes on the time-delay channel to generate the time-delay domain response during a duration of a time frame for the transmitted signal (e.g., for 1, 2, . . NM time slots). In some examples, the interpolation may be either a spline or a linear interpolation, and may include estimating values based on a range of known values. Additionally, or alternatively, the UE 115-*a* may perform one or more extrapolation processes to estimate the time-delay domain response. For instance, the UE 115-*a* may include insufficient data for interpolation on a later symbol, and may use extrapolation to infer values instead, where extrapolation may include inferring values based on known trends in previous symbols. In some examples, the UE 115-*a* may perform the OTFS estimation procedures described herein on any OTFS waveform, including time domain signals without a DMRS sequence multiplexed with data. In some examples, the UE 115-*a* may identify a mapping of the sequence for the DMRS to a first position corresponding to a first set of consecutive delay values in a delay domain of the delay-Doppler domain and a mapping of the truncated sequence to a second position corresponding to a second set of consecutive delay values in the delay domain of the delay-Doppler domain. The second position may follow the first position in the delay domain, or the first position may follow the second position in the delay domain, based on a circular association between positions in the delay domain of the delay-Doppler domain.

In some examples, the network entity 105-*a* and the UE 115-*a* may participate in additional signaling to enhance communications. For example, the network entity 105-*a* may indicate, to the UE 115-*a*, position and sequence information of the DMRS sequence in the delay-Doppler domain for the time domain signal 215. In some examples, the position and sequence information may include a configuration of the DMRS sequence, the truncated sequence, and the data in the time domain signal 215 as described herein (e.g., the order of the samples in each symbol of the time domain signal 215). Additionally, or alternatively, the position and sequence information may include an indication of a type of the DMRS sequence (e.g., Zadoff-Chu sequence, a pseudo-random noise sequence, or the like). In some cases, the position and sequence information may also include an indication of a cyclic prefix in the time domain signal 215. In some examples, the position and sequence information may include an indication of an additional copy of the DMRS added in the time domain to the time domain signal 215 as described in greater detail with reference to FIGS. 5 and 6. In some examples, the network entity 105-*a* may include the position and sequence information in an RRC or a downlink control information (DCI) message transmitted over the downlink communication link 205.

In some examples, the UE 115-*a* may transmit additional indications to the network entity 105-*a*. For instance, the UE 115-*a* may transmit a capability report indicating whether the UE 115-*a* may support different DMRS configurations. In some cases, the UE 115-*a* may support or may not support decoding an OTFS waveform that includes additional copies of the DMRS sequence as described in further detail with reference to FIG. 3, and may indicate this capability to the network entity 105-*a* via the uplink communication link 210. The UE 115-*a* may also transmit other information to the network entity 105-*a* via the uplink communication link 210, including connection requests (e.g., for a random access procedure), control information, and other signaling.

In some examples, the OTFS modulation process 220 may present advantages over OFDM. For example, the time domain conversion process 260 may represent an example of an OFDM process. In some examples, for OFDM, the network entity 105-*a* may map QAM info samples to the time-frequency domain instead of the delay-Doppler domain by placing the samples in the time-frequency matrix 255. Thus, the symbols at the output of the ISFFT 235 may include similar symbols to those mapped to the time-frequency domain in OFDM. The OFDM process may additionally include applying one or more IFFTs 240 to the time-frequency matrix 255, as well as the time domain signal generation process 265 to generate the time domain signal 215. The UE 115-*a* may also apply an inverse of the OFDM process to decode the time domain signal 215.

However, as described with reference to FIG. 1, performing the OTFS modulation process 220 in place of an OFDM process may mitigate high Doppler spread, as well as produce constant fading and higher multi-path diversity. Additionally, as described herein, multiplexing DMRS sequences with data in OTFS waveforms may further reduce PAPR in communications.

Figure 3:
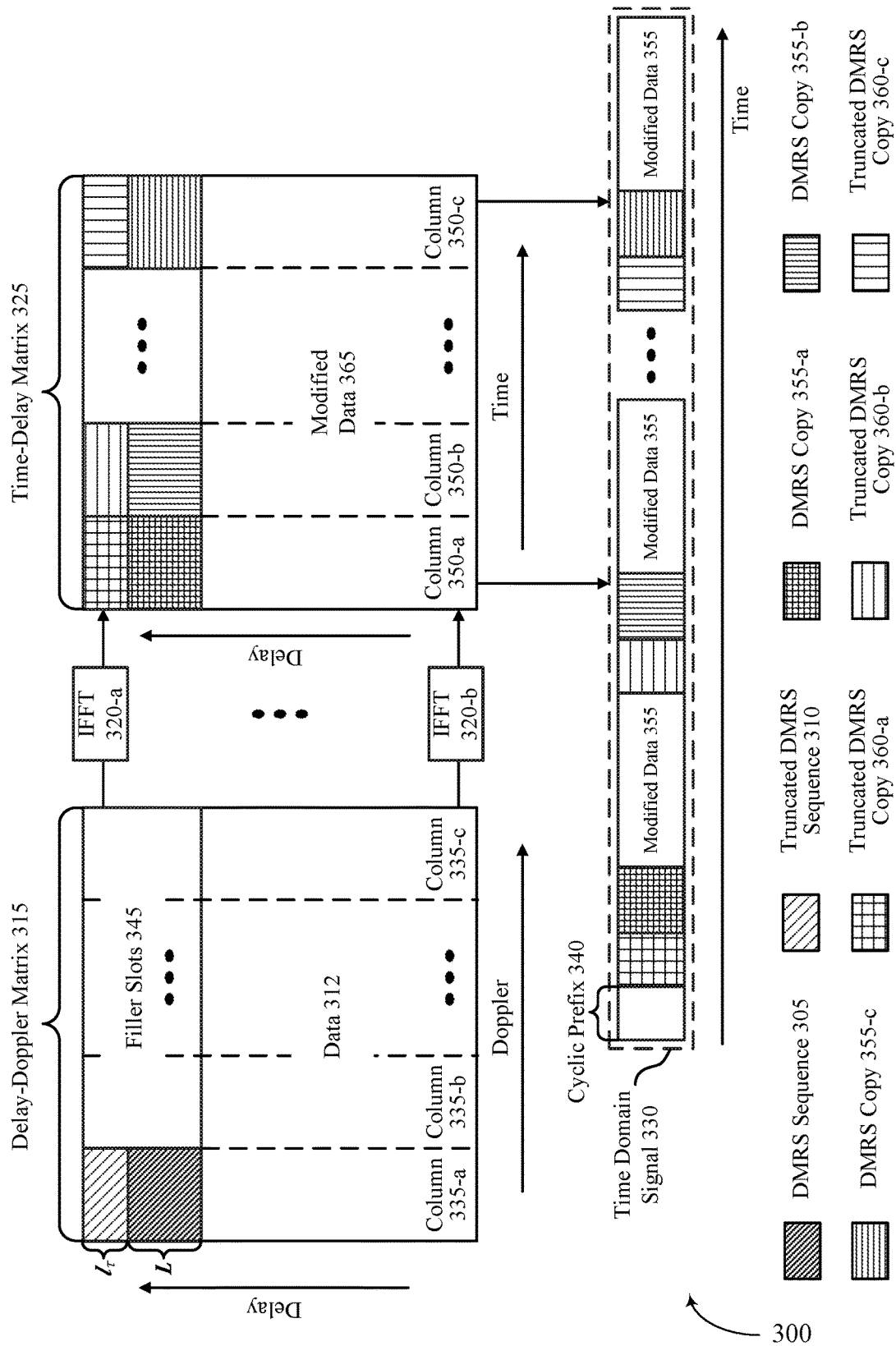
FIG. 3 illustrates an example of a signal generation process that supports multiplexing DMRS and data in OTFS waveform in accordance with one or more aspects of the present disclosure.

FIG. 3 illustrates an example of a signal generation process 300 that supports multiplexing DMRS and data in OTFS waveform in accordance with one or more aspects of the present disclosure. In some examples, the signal generation process 300 may implement, or be implemented by, aspects of the wireless communications system 100 or the wireless communications system 200. In some cases, the signal generation process 300 may represent multiplexing a DMRS with data in an OTFS modulation process 220 as described with reference to FIG. 2. For example, the signal generation process 300 may include placing a DMRS sequence 305, a truncated DMRS sequence 310, and data 312 into a delay-Doppler matrix 315. In some examples, the DMRS sequence 305 and the truncated DMRS sequence 310 may represent examples of a DMRS sequence with good correlation properties and a truncated sequence including a truncated number of last samples of the DMRS sequence, respectively, as described with reference to FIG. 2. The signal generation process 300 may include applying one or more IFFTs 320, including IFFT 320-a through IFFT 320-b, across the rows of the delay-Doppler matrix 315 to generate a time-delay matrix 325. In some cases, the signal generation process 300 may include reading the time-delay matrix 325 to generate a time domain signal 330. In some examples, the delay-Doppler matrix 315, the IFFT 320-a through the IFFT 320-b, the time-delay matrix 325, and the time domain signal 330 may represent examples of the delay-Doppler matrix 230, the IFFT 240-a through the IFFT 240-b, the time-delay matrix 245, and the time domain signal 215, respectively, as described with reference to FIG. 2.

In some examples, the signal generation process 300 may include mapping the DMRS sequence 305 into the delay-Doppler domain. For example, a network entity may map the DMRS sequence 305 and the truncated DMRS sequence 310 in a first column 335-a of the Doppler axis of the delay-Doppler matrix 315, and may map the truncated DMRS sequence 310 before the DMRS sequence 305 at a first row in the delay axis in the delay-Doppler matrix 315. In some examples, such OTFS mapping may differ from OFDM mapping. For example, in OFDM, a network entity or other device may instead map a DMRS into a time-frequency matrix using a distributed pattern by inserting the DMRS at uniform intervals of time and frequency dimensions. In some examples, a network entity may include a time-frequency matrix with 256 subcarriers, and may place a DMRS at every 1 out of 8 subcarriers to distribute the DMRS uniformly in a time-frequency matrix.

In some examples, the DMRS sequence 305 may have a length L of samples in the delay domain and the truncated DMRS sequence 310 may have a length $l_\tau$ of samples in the delay domain as described with reference to FIG. 2. In some examples, the delay domain length of the DMRS sequence 305 and the truncated DMRS sequence 310 together may represent L+$l_\tau$, where $$l_\tau = \frac{\tau_{max}}{bandwidth}$$

may represent a maximum number of delay taps, $\tau_{max}$ may represent a maximum delay spread, and bandwidth may represent an available bandwidth. In some examples, $l_\tau$ may equal a configured length of a cyclic prefix 340 included in the time domain signal 330. In some cases, $\tau_{max}$ may be based on the configured length of the cyclic prefix 340, where the cyclic prefix length may be either a normal or an extended cyclic prefix length. In some cases, a network entity may decide on the length of the cyclic prefix 340 (e.g., normal or extended) based on a mode configuration. In some examples, a network entity may choose L so L≥$l_\tau$ to estimate channel delay spread τ. In some cases, the network entity may choose a high value of L to improve channel estimation performance at a UE. In some examples, L=$l_\tau$ may represent a minimum value for L for estimating the channel delay spread. Additionally, or alternatively, a network entity may further improve channel estimation performance at a UE by increasing a power of samples of the DMRS sequence 305 with a tradeoff of increased PAPR for communications including the DMRS sequence 305.

In some examples, the DMRS sequence 305 and the truncated DMRS sequence 310 may have a same length of samples in the Doppler domain equal to 4$k_v$, where $$k_v = \frac{v_{max}}{NT}$$

and −$k_v$ may represent a maximum and minimum number of Doppler taps, respectively. In some cases, $v_{max}$ may represent a maximum Doppler value based on different characteristics of devices in communication with the network entity. For example, in high speed scenarios such as with device communications on a highway, a device may replace $v_{max}$ with a high value (e.g., 200 km/h). In some examples, NT may represent a total duration of an OTFS waveform for the time domain signal 330. In some cases, the length of the samples for the DMRS sequence 305 and the truncated DMRS sequence 310 in the Doppler domain 4$k_v$ may equal twice a Doppler spread, where the Doppler spread may equal 2$k_v$. In some examples, for smaller values of N, where N represents a number of symbols as described with reference to FIG. 2, a network entity may select the length of the DMRS sequence 305 in the Doppler domain to equal N. In some examples, the network entity may select the length of the DMRS sequence 305 to equal N due to a high Doppler spread 2$k_v$ caused by a low number of symbols N and a corresponding low Doppler resolution. In some examples, the length of the DMRS sequence 305 and the truncated DMRS sequence 310 may represent a value less than N to allow multiplexing of the DMRS sequence 305 with the data 312 in the Doppler domain.

In some examples, the truncated DMRS sequence 310 may act as a guard to prevent the data 312 from interfering with the DMRS sequence 305. For example, the delay-Doppler matrix 315 may be circularly shifted along the delay axis, where the bottom row in the delay axis of the data 312 may be adjacent to the truncated DMRS sequence 310 in the delay domain. In some examples, the data 312 may interfere with samples mapped adjacent to the bottom row of the data 312 in the delay domain. For example, the data 312 may interfere with the truncated DMRS sequence 310, and thus the $l_\tau$ DMRS samples in the truncated DMRS sequence 310 placed between the DMRS sequence 305 and the data 312 in the delay axis may act as a guard by preventing interference from data 312 on the DMRS sequence 305. In some examples, the network entity may not be able to prevent interference on the DMRS sequence 305, and thus may use the guard to protect the DMRS sequence 305. In some examples, using the truncated DMRS sequence 310 as a guard may enable the use of a circular convolution for decoding as described herein using the relationship between the truncated DMRS sequence 310 and the DMRS sequence 305, which may thus reduce complexity in channel estimation. In some examples, the samples input in the delay-Doppler matrix 315 may be shifted by the amount of delay spread $\tau$ and Doppler spread $2k_v$ at the output of the OTFS operation (e.g., at the time domain signal 330).

In some examples, the signal generation process 300 may include one or more filler slots 345. For example, a network entity may place the DMRS sequence 305 and the truncated DMRS sequence 310 in the first column 335-a of the Doppler axis and may fill the other Doppler dimensions of the delay-Doppler matrix 315 at the same delay location as the DMRS sequence 305 and the truncated DMRS sequence 310 with filler values. In some examples, the network entity may place values of 0 in the filler slots 345 at the column 335-b through the column 335-c, where the filler slots 345 may have a delay axis length of $L+l_\tau$. Additionally, or alternatively, the filler slots 345 may include a row of filler slots with length L corresponding to the delay location of the DMRS sequence 305, and a row of filler slots with length $l_\tau$ corresponding to the delay location of the truncated DMRS sequence 310. In some cases, the filler slots 345 may include values of 0 to copy the DMRS sequence 305 and the truncated DMRS sequence 310 in the time-delay domain as described in further detail with reference to the time-delay matrix 325. In some cases, the signal generation process 300 may include mapping the DMRS sequence 305 and the truncated DMRS sequence 310 anywhere in the delay domain of the delay-Doppler matrix 315, where the truncated DMRS sequence 310 may precede the DMRS sequence 305 in the delay domain, and may be in a same column 335 as the DMRS sequence 305. In some examples, the filler slots 345 may also be mapped or otherwise placed anywhere in the delay domain, where the filler slots 345 may share same rows or delay locations as the DMRS sequence 305 and the truncated DMRS sequence 310. In some examples, a Doppler spread for the delay-Doppler matrix 315 may be considered as N for small values of N (e.g., may equal 14).

In some examples, the signal generation process 300 may include converting the samples in the delay-Doppler matrix 315 to the time-delay domain to copy the DMRS sequence 305 and the truncated DMRS sequence 310. For example, a network entity may apply the IFFT 320-a through the IFFT 320-b on respective rows of the delay-Doppler matrix 315. In some examples, the IFFT 320-a through the IFFT 320-b may include N IFFTs 320. The output of the IFFT 320-a through the IFFT 320-b may include the time-delay matrix 325. In some examples, applying the IFFTs 320 on the DMRS sequence 305, the truncated DMRS sequence 310, and the filler slots 345 including values of 0, may produce N copies of the DMRS sequence 305 and the truncated DMRS sequence 310. For example, the column 350-a of the time-delay matrix 325 may include a DMRS copy 355-a and a truncated DMRS copy 360-a. The column 350-b may include a DMRS copy 355-b and a truncated DMRS copy 360-b, and the column 350-c may include a DMRS copy 355-c and a truncated DMRS copy 360-c. Any intervening columns may additionally include respective DMRS copies 355 and truncated DMRS copies 360. In some examples, applying the IFFTs 320 on the data 312 may produce modified data 365. In some examples, the DMRS copies 355, the truncated DMRS copies 360, and the modified data 365 in each column may represent a symbol of N symbols.

In some examples, the signal generation process 300 may include reading the columns 350 of the time-delay matrix 325 to generate the time domain signal 330. For example, the signal generation process 300 may represent a simplified conversion process and may omit converting to the time-frequency domain as described with reference to FIG. 2. In some examples, a network entity may read each column 350 in succession from top to bottom to generate N symbols, where each symbol may correspond to a respective column 350 of the time-delay matrix 325. In some examples, the first symbol of the N symbols in the time domain signal 330 may include the contents of the column 350-a, including the DMRS copy 355-a, the truncated DMRS copy 360-a, and the corresponding modified data 365. The next symbol may include the contents of the column 350-b, including the DMRS copy 355-b, the truncated DMRS copy 360-b, and the corresponding modified data 365. Any following symbols up to and including the last symbol may include the contents of corresponding columns 350, where the last symbol may include the contents of the column 350-c, including the DMRS copy 355-c, the truncated DMRS copy 360-b, and the corresponding modified data 365. In some examples, the network entity may add the cyclic prefix 340 to the beginning of the time domain signal 330. In some cases, the cyclic prefix 340 may represent an example of the truncated DMRS sequence 310 and may have a length of $l_\tau$ samples. In some examples, the network entity may transmit the time domain signal 330 to a device (e.g., a UE) in the time domain after the signal generation process 300. In some cases, the signal generation process 300 may include converting the time-delay matrix 325 to a time-frequency matrix using one or more FFTs, and reading the output of one or more IFFTs applied to the time-frequency matrix to generate the time domain signal 330.

Figure 4:
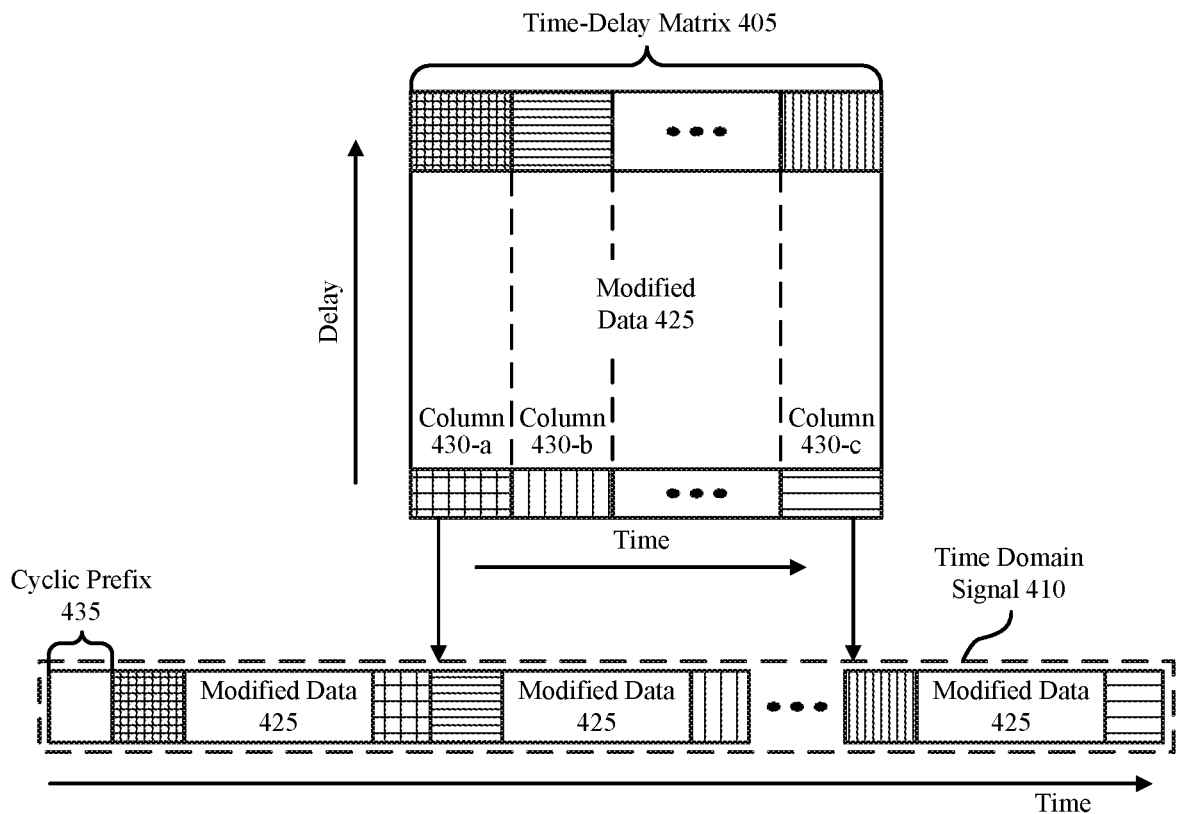
FIG. 4 illustrates an example of a signal generation process that supports multiplexing DMRS and data in OTFS waveform in accordance with one or more aspects of the present disclosure.

FIG. 4 illustrates an example of a signal generation process 400 that supports multiplexing DMRS and data in OTFS waveform in accordance with one or more aspects of the present disclosure. In some examples, the signal generation process 400 may implement, or be implemented by, aspects of the wireless communications system 100 or the wireless communications system 200. In some examples, the signal generation process 400 may implement, or be implemented by, aspects of the signal generation process 300. In some cases, the signal generation process 400 may represent multiplexing a DMRS sequence with data as described with reference to FIG. 3. For example, the signal generation process 300 may include placing a DMRS sequence, a truncated DMRS sequence, and data in a delay-Doppler matrix, and converting the delay-Doppler matrix to a time-delay matrix 405. The signal generation process 400 may additionally include converting the time-delay matrix 405 to generate a time domain signal 410.

In some examples, the signal generation process 400 may include mapping a DMRS sequence and a truncated DMRS sequence to the top and bottom of the delay domain, respectively. For example, a network entity may map a DMRS sequence in a first column of a Doppler axis and in a first row of a delay axis of a delay-Doppler matrix, while placing a truncated DMRS sequence in the first column of the Doppler axis but in a last row of the delay axis. The network entity may include corresponding filler slots for the additional columns corresponding to the first and last row of the delay axis. In some examples, the filler slots may be of length L and length $l_\tau$ samples and may correspond to the rows of the DMRS sequence and the truncated DMRS sequence, respectively, and may include values of 0.

In some examples, the network entity may apply one or more IFFTs to the delay-Doppler matrix to generate DMRS copies 415 and truncated DMRS copies 420. For example, the time-delay matrix 405 may include DMRS copy 415-*a* through DMRS copy 415-*c* in the last row of a delay axis, and truncated DMRS copy 420-*a* through truncated DMRS copy 420-*c* in the first row of the delay axis. The time-delay matrix 405 may also include modified data 425, where the modified data 425 may be based on the data mapped to the delay-Doppler matrix. In some examples, the DMRS copies 415 and the truncated DMRS copies 420, including respective samples of the modified data 425, may occupy corresponding columns 430, including column 430-*a* through column 430-*c*. In some examples, the truncated DMRS copy 420-*a* through the truncated DMRS copy 420-*c* may act as guards to stop interference due to circular convolution from the modified data 425 on the DMRS copy 415-*a* through the DMRS copy 415-*c*. In some cases, the truncated DMRS copies 420 may prevent interference due to placement of the truncated DMRS copies 420 after the modified data 425 in the delay axis. In some examples, the time-delay matrix 405, the DMRS copies 415, the truncated DMRS copies 420, and the modified data 425 may represent examples of the time-delay matrix 325, the DMRS copies 355, the truncated DMRS copies 360, and the modified data 365 described with respect to FIG. 3.

In some examples, the signal generation process 400 may include converting the time-delay matrix 405 to the time domain to generate the time domain signal 410. For example, a number N" of DFTSs and a number N of IFFTs for converting to the time-frequency domain and to the time domain may be equal as described with reference to FIG. 2. Thus a network entity may refrain from converting to the time-frequency domain and may use a simpler OTFS process to convert directly to the time domain by reading the time-delay matrix 405. In some examples, the network entity may read each column in succession to generate N symbols as described with reference to FIG. 3. For example, the network entity may read the column 430-*a* through the column 430-*c* to generate N symbols, where each symbol may include a corresponding DMRS copy 415, followed by corresponding modified data 425, followed by a corresponding truncated DMRS copy 420. In some examples, the network entity may add a cyclic prefix 435 to the beginning of the time domain signal 410. In some cases, the cyclic prefix 435 may represent a copy of the truncated DMRS as described with reference to FIG. 3.

In some examples, a network entity may transmit an indication of the position and sequence of a DMRS in the time domain signal 410 to a receiving device (e.g., UE). For example, before transmitting the time domain signal 410 to a UE, the network entity may transmit a signal indicating the order of the contents, where the order may include the corresponding DMRS copy 415, followed by the corresponding modified data 425, followed by the corresponding truncated DMRS copy 420. In some cases, the indication may indicate that the cyclic prefix 435 is mapped at the beginning of the time domain signal 410. In some examples, the UE may receive the indication and the time domain signal 410, and may decode the time domain signal 410. In some examples, the UE may use the position and sequence information from the indication to perform channel estimation as described with reference to FIG. 2. In some cases, the UE may use the first row of the time-delay domain and the delay-Doppler domain containing the DMRS copies 415 for the channel estimation.

In some examples, the time domain signal 410 may represent a guard interval based waveform. For instance, a guard interval may represent a fixed sequence in the time domain to prevent interference. In some examples, a guard interval based waveform may include a guard interval in place of or including a cyclic prefix, and may include the guard interval in each symbol of the guard interval based waveform. In some cases, each truncated DMRS copy 420 may represent a fixed sequence of sequentially last samples of a DMRS and may block interference as described herein. The truncated DMRS copies 420 may thus act as guard intervals in each symbol of the time domain signal 410. For example, the truncated DMRS copy 420-*a* may act as a guard interval for a first symbol in the time domain signal 410. The cyclic prefix 435 may also represent an additional truncated DMRS copy 420. In some examples, using a guard interval based waveform may simplify implementation at a transmitter (e.g., at a network entity) due to the predictability of a known truncated DMRS sequence used at the end of each symbol.

Figure 5:
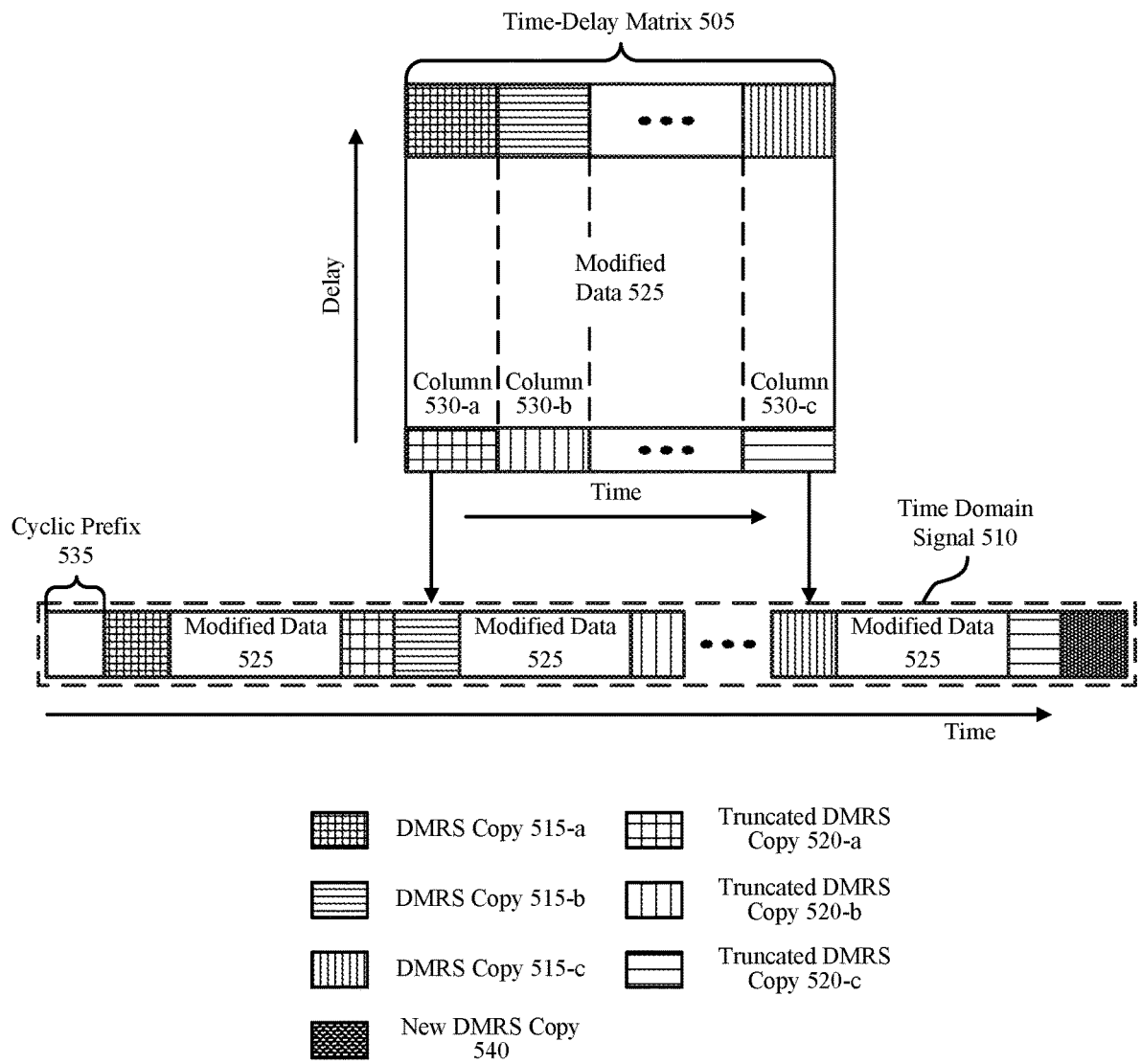
FIG. 5 illustrates an example of a signal generation process that supports multiplexing DMRS and data in OTFS waveform in accordance with one or more aspects of the present disclosure.

FIG. 5 illustrates an example of a signal generation process 500 that supports multiplexing DMRS and data in OTFS waveform in accordance with one or more aspects of the present disclosure. In some examples, the signal generation process 500 may implement, or be implemented by, aspects of the wireless communications system 100 or the wireless communications system 200. In some examples, the signal generation process 500 may implement, or be implemented by, aspects of the signal generation process 300 or the signal generation process 400. In some cases, the signal generation process 500 may represent placing a DMRS sequence and a truncated DMRS sequence at the top and bottom of the delay domain, respectively, as described with reference to FIG. 4. For example, the signal generation process 500 may include placing a DMRS sequence and a truncated DMRS sequence at the top and bottom of the delay axis of a delay-Doppler matrix with data, respectively, and converting the delay-Doppler matrix to a time-delay matrix 505. The signal generation process 500 may additionally include reading the time-delay matrix 505 to generate a time domain signal 510.

In some examples, processes and components of the signal generation process 500 may represent examples of the processes and components of the signal generation process 400 described with reference to FIG. 4. For example, a network entity may generate the time-delay matrix 505 after applying N IFFTs on the rows of the delay-Doppler matrix including the DMRS sequence and the truncated DMRS sequence. In some examples, the network entity may apply one or more IFFTs to the delay-Doppler matrix to generate DMRS copy 515-*a* through DMRS copy 515-*c* and truncated DMRS copy 520-*a* through truncated DMRS copy 520-*c*, which may represent examples of DMRS copy 415-*a* through DMRS copy 415-*c* and truncated DMRS copy 420-*a* through truncated DMRS copy 420-*c*, respectively, as described with reference to FIG. 4. The time-delay matrix 505 may also include modified data 525, which may represent an example of the modified data 425 described with reference to FIG. 4. In some examples, the DMRS copies 415 and the truncated DMRS copies 420 may occupy corresponding columns 530, including column 530-*a* through column 530-*c*, which may represent examples of the column 430-*a* through the column 430-*c* as described with reference to FIG. 4. In some examples, the time-delay matrix 505, the time domain signal 510, and cyclic prefix 535 may represent the time-delay matrix 405, the time domain signal 410, and the cyclic prefix 435 as described with reference to FIG. 4. In some examples, the signal generation process 500 may include using a simplified time domain conversion process, using the truncated DMRS copies 520 as guards and guard intervals, and indicating position and sequence of the DMRS to a UE as described with reference to FIG. 4.

In some examples, the signal generation process 500 may include adding an additional copy of the DMRS sequence to a sequentially last position of the time domain signal 510. For example, a network entity may add a new DMRS copy 540 to the end of the time domain signal 510, where the new DMRS copy 540 may have a length L. In some examples, the network entity may not include the new DMRS copy 540 in the delay-Doppler matrix, the time-delay matrix 505, or any other matrices in the signal generation process 500, and may add the new DMRS copy 540 to the time domain signal 510 directly in the time domain. In some cases, adding the new DMRS copy 540 may include adding a Zadoff-Chu sequence or other sequence with good correlation properties represented by the new DMRS copy 540 and the DMRS copies 515.

In some examples, adding the DMRS copy 540 to the end of the time domain signal 510 may produce better channel estimation for a sequentially last symbol. For example, a UE may perform interpolation for each symbol using the DMRS from the DMRS copies 515. However, the UE may include high Doppler spread channels, and may not be able to accurately estimate a sequentially last symbol of the time domain signal 510 including the DMRS copy 515-$c$ and the truncated DMRS copy 520-$c$. Additionally, or alternatively, the UE may use extrapolation to estimate the time-delay channel for the last symbol, where extrapolation may include inferring estimations based on known trends in previous symbols. However, extrapolation may obtain less accurate channel estimations for the last symbol. Thus, the network entity may add the new DMRS copy 540 to the end of the time domain signal 510 to enable interpolation at the UE for the last symbol to provide better channel estimation for the last symbol. For example, due to the new DMRS copy 540, the UE may perform an additional channel estimation process at the end of the time domain signal 510, allowing for an additional accurate channel estimation for the last symbol.

Figure 6:
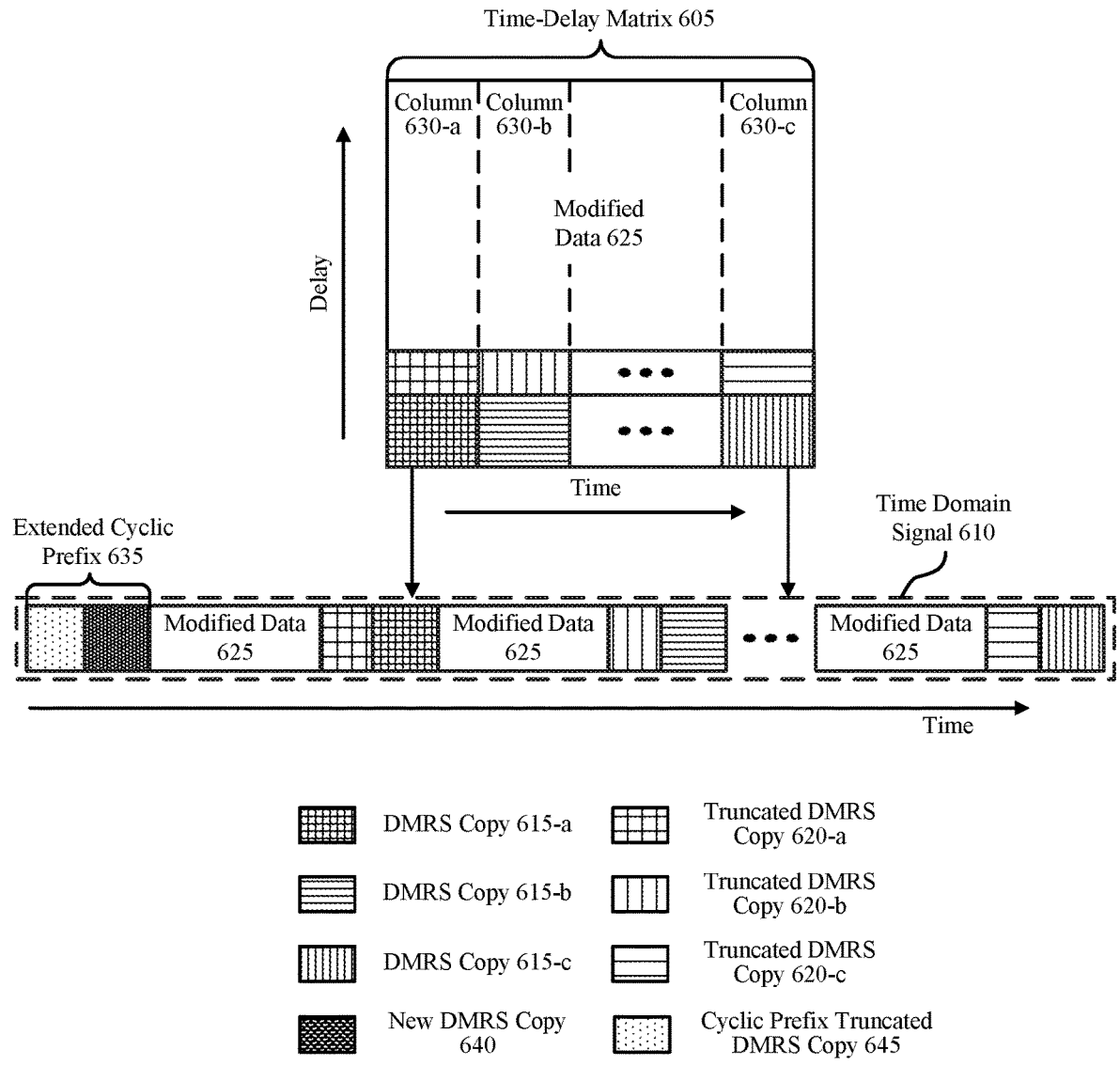
FIG. 6 illustrates an example of a signal generation process that supports multiplexing DMRS and data in OTFS waveform in accordance with one or more aspects of the present disclosure.

FIG. 6 illustrates an example of a signal generation process 600 that supports multiplexing DMRS and data in OTFS waveform in accordance with one or more aspects of the present disclosure. In some examples, the signal generation process 600 may implement, or be implemented by, aspects of the wireless communications system 100 or the wireless communications system 200. In some examples, the signal generation process 600 may implement, or be implemented by, aspects of the signal generation processes 300, 400, or 500. In some cases, the signal generation process 600 may represent multiplexing a DMRS sequence with data as described with reference to FIGS. 3, 4, and 5. For example, the signal generation process 600 may include placing a DMRS sequence, a truncated DMRS sequence, and data in a delay-Doppler matrix, and converting the delay-Doppler matrix to a time-delay matrix 605. The signal generation process 600 may additionally include reading the time-delay matrix 605 to generate a time domain signal 610.

In some examples, the signal generation process 600 may include mapping the DMRS sequence and the truncated DMRS sequence to the bottom two rows (e.g., last two dimensions) of the delay domain. For example, a network entity may map a DMRS sequence in a first column of the Doppler domain and in a last row of the delay domain of a delay-Doppler matrix, while placing a truncated DMRS sequence in the first column of the Doppler domain but in a second to last row of the delay domain of the delay-Doppler matrix. The network entity may include corresponding filler slots for the additional columns corresponding to the first row and the last row. In some examples, the filler slots may include values of 0, may be of length L and length $l_\tau$ samples and may correspond to the rows of the DMRS sequence and the truncated DMRS sequence, respectively.

In some examples, the network entity may apply one or more IFFTs to the delay-Doppler matrix to generate DMRS copies 615 and truncated DMRS copies 620. For example, the time-delay matrix 605 may include DMRS copy 615-$a$ through DMRS copy 615-$c$ in the last row of the delay axis, and truncated DMRS copy 620-$a$ through truncated DMRS copy 620-$c$ in the second to last row of the delay axis. The time-delay matrix 605 may also include modified data 625 before the DMRS copies 615 and the truncated DMRS copies 620 in the delay domain, where the modified data 625 may be based on the data mapped to the delay-Doppler matrix. In some examples, the DMRS copies 615 and the truncated DMRS copies 620, including respective samples of the modified data 625, may occupy corresponding columns 630, including column 630-$a$ through column 630-$c$. In some examples, the truncated DMRS copy 620-$a$ through the truncated DMRS copy 620-$c$ may act as guards to stop interference due to circular convolution from the modified data 625 on the DMRS copy 615-$a$ through the DMRS copy 615-$c$. In some cases, the truncated DMRS copies 620 may stop interference due to placement of the truncated DMRS copies 620 after the modified data 625 in the delay domain. In some examples, the DMRS copies 615, the truncated DMRS copies 620, and the modified data 625 may represent examples of the DMRS copies 355, the truncated DMRS copies 360, and the modified data 365 described with respect to FIG. 3.

In some examples, the signal generation process 600 may include converting the time-delay matrix 605 to the time domain to generate the time domain signal 610. For example, a number N" of DFTSs and a number N of IFFTs for converting to the time-frequency domain and to the time domain may be equal as described with reference to FIG. 2. Thus a network entity may refrain from converting to the time-frequency domain and may use a simpler OTFS process to convert directly to the time domain by reading the time-delay matrix 605. In some examples, the network entity may read each column 630 in succession to generate N symbols. For example, the network entity may read the column 630-$a$ through the column 630-$c$ to generate N symbols, where each symbol may include corresponding modified data 625, followed by a corresponding truncated DMRS copy 620, followed by a corresponding DMRS copy 615. In some examples, the signal generation process 600 may include using the truncated DMRS copies 620 as guard intervals and indicating position and sequence of the DMRS to a UE as described with reference to FIG. 4.

In some examples, the network entity may add an extended cyclic prefix 635 to the beginning of the time domain signal 610. In some cases, the extended cyclic prefix 635 may include both a copy of the truncated DMRS sequence as described with reference to FIG. 3, as well as a copy of the DMRS sequence. For example, the extended cyclic prefix 635 may include a new DMRS copy 640 and a cyclic prefix truncated DMRS copy 645, and may have a length of L+$l_\tau$ samples. In some examples, the new DMRS copy 640 may represent an example of the new DMRS copy 540 as described with reference to FIG. 5. In some examples, the cyclic prefix truncated DMRS copy 645 may represent an example of the truncated DMRS sequence included in the cyclic prefixes 340, 435, and 535 as described with reference to FIGS. 3, 4, and 5, respectively.

In some cases, using the extended cyclic prefix 635 in place of a smaller cyclic prefix (e.g., the cyclic prefixes 340, 435, and 535) may produce better channel estimation for the first symbol. For example, a UE may perform interpolation for each symbol using the DMRS from the DMRS copies 615. However, the UE may include high Doppler spread channels, and may miss estimation for the first symbol including the DMRS copy 615-a and the truncated DMRS copy 620-a. Additionally, or alternatively, the UE may use extrapolation to estimate the time-delay channel for the first symbol, resulting in less accurate channel estimation for the first symbol. Thus, the network entity may add the new DMRS copy 640 to the extended cyclic prefix 635 to enable interpolation for the first symbol, and may thus provide better channel estimation for the first symbol. For example, by adding the new DMRS copy 640, the UE may perform an additional channel estimation process at the beginning of the time domain signal 610, allowing for an additional accurate channel estimation for the first symbol.

Figure 7:
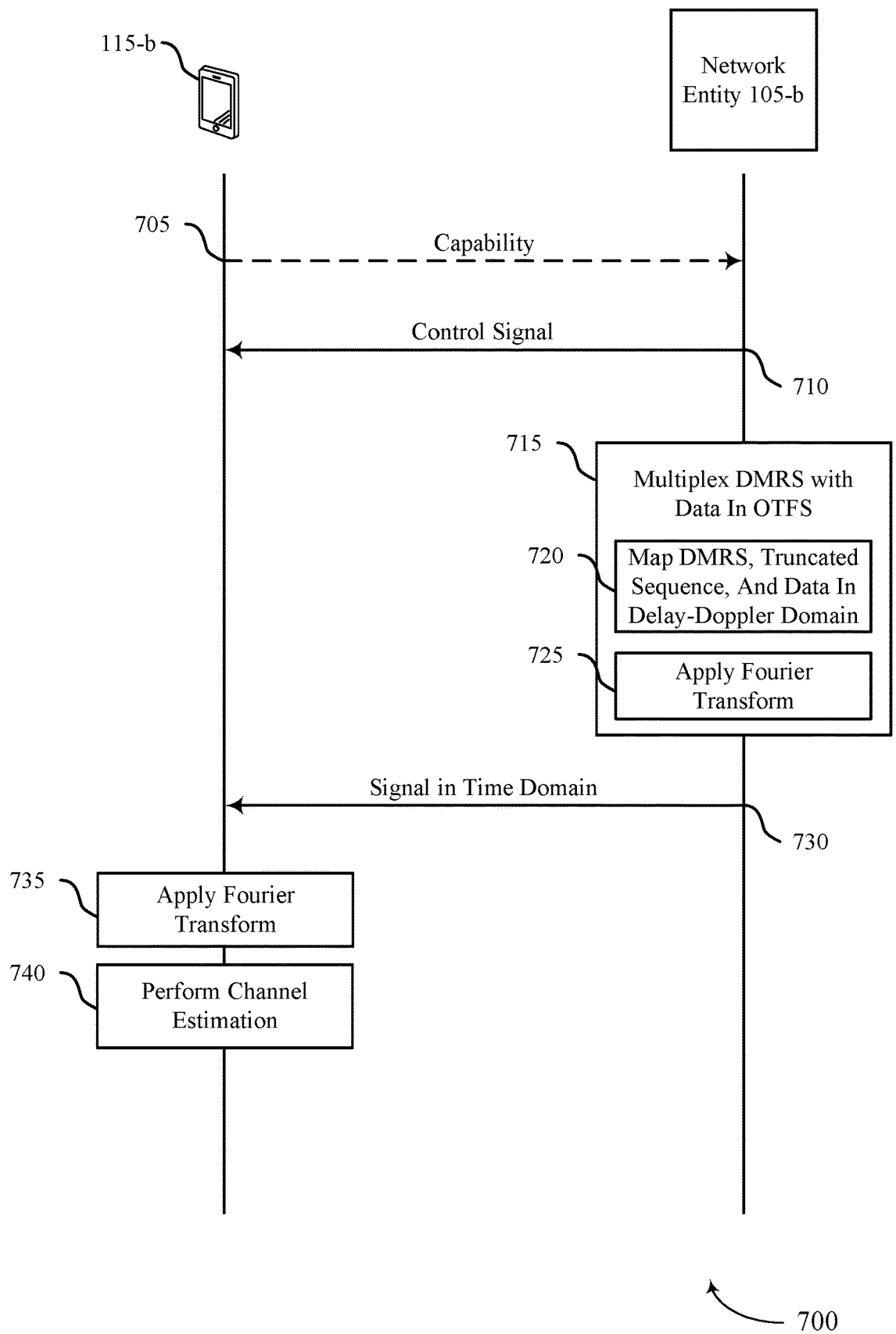
FIG. 7 illustrates an example of a process flow that supports multiplexing DMRS and data in OTFS waveform in accordance with one or more aspects of the present disclosure.

FIG. 7 illustrates an example of a process flow 700 that supports multiplexing DMRS and data in OTFS waveform in accordance with one or more aspects of the present disclosure. In some examples, the process flow 700 may implement aspects of the wireless communications system 100, the wireless communications system 200, and the signal generation processes 300, 400, 500, and 600. The process flow 700 may illustrate an example of a network entity 105-b multiplexing a DMRS with data in OTFS to generate a time domain signal, and a UE 115-b performing channel estimation based on the time domain signal. The network entity 105-b and the UE 115-b may be examples of a network entity 105 and a UE 115 as described with reference to FIG. 1, or the network entity 105-a and the UE 115-a as described with reference to FIG. 2, respectively. Alternative examples of the following may be implemented, where some processes are performed in a different order than described or are not performed. In some cases, processes may include additional features not mentioned below, or further processes may be added.

At 705, the UE 115-b may transmit, and the network entity 105-b may receive, a capability for supporting reception of a sequence of a DMRS at a sequentially last position of a signal in time domain or included in an extended cyclic prefix. In some examples, the signal in the time domain may include the extended cyclic prefix.

At 710, the network entity 105-b may output, and the UE 115-b may receive, a control signal indicating a position of a transmission of a DMRS and a sequence for the DMRS in a delay-Doppler domain. In some cases, the DMRS may include a set of input samples. In some examples, the network entity 105-b may determine the sequence for the DMRS based on an operating modulation and coding scheme and a signal to noise ratio value.

At 715, the network entity 105-b may multiplex the DMRS with data in OTFS. For example, at 720, the network entity 105-b may map the DMRS, a truncated sequence, and data in the delay-Doppler domain in accordance with the control signal. In some examples, the mapping may be based on obtaining the capability from the UE 115-b. In some cases, the truncated sequence may include a subset of the set of input samples included in the sequence for the DMRS. In some examples, the sequence for the DMRS and the truncated sequence may include Zadoff-Chu sequences, or any other sequence as described with reference to FIG. 3 (e.g., a pseudo-random noise sequence). In some examples, a length of the sequence for the DMRS in a delay domain of the delay-Doppler domain may be based on a maximum delay spread and a bandwidth. In some examples, a length of the sequence for the DMRS in a Doppler domain of the delay-Doppler domain may be based on a maximum Doppler value and a total duration of an OTFS waveform.

In some examples, the network entity 105-b may map the sequence for the DMRS and the truncated sequence to a continuous set of resources in a delay domain of the delay-Doppler domain for one or more consecutive Doppler values of the delay-Doppler domain. In some cases, the DMRS and the truncated sequence may include a non-zero value for at least one Doppler value of the one or more consecutive Doppler values. In some examples, the network entity 105-b may map the sequence for the DMRS to a first position corresponding to a first set of consecutive delay values in the delay domain of the delay-Doppler domain for one or more Doppler values of the delay-Doppler domain. In some examples, the network entity 105-b may map the truncated sequence to a second position corresponding to a second set of consecutive delay values in the delay domain of the delay-Doppler domain for the one or more Doppler values of the delay-Doppler domain.

In some cases, the first position may follow the second position based on a circular association between a set of multiple positions in the delay domain of the delay-Doppler domain as described with reference to FIGS. 3 and 6. Alternatively, in some examples, the second position may follow the first position based on the circular association as described with reference to FIGS. 4 and 5. In some cases, the network entity 105-b may map the data to a third position in the delay domain of the delay-Doppler domain, where the third position may be different from the first position and the second position. For example, the third position may follow the first position in the delay domain, and the second position may follow the third position in the delay domain as described with reference to FIGS. 4 and 5. In some examples, the third position may follow the first position and the second position in the delay domain as described with reference to FIG. 3. In some examples, the first position and the second position may follow the third position in the delay domain as described with reference to FIG. 6.

At 725, the network entity 105-b may apply a Fourier transform on the mapped DMRS, the truncated sequence, and the data to generate a signal in the time domain. For example, the network entity 105-b may apply one or more IFFTs, DFTS, or ISFFTs, or any combination thereof, to convert the mapped DMRS, truncated sequence, and data to the time-delay domain, to the time-frequency domain, and to the time domain as described with reference to FIG. 2. In some examples, the network entity 105-b may apply one or more IFFTs and may read the output of the one or more IFFTs to generate the signal in the time domain using a simplified conversion process as described with reference to FIG. 2. In some examples, applying the Fourier transform may be based on mapping the sequence for the DMRS and the truncated sequence to the continuous set of resources in the delay domain of the delay-Doppler domain and to the first and second positions corresponding to the first and second sets of consecutive delay values in the delay domain of the delay-Doppler domain.

At 730, the network entity 105-b may output, and the UE 115-b may receive, the signal in the time domain, where the signal may include the sequence for the DMRS, the truncated sequence, and the data. In some examples, the signal in the time domain may represent a signal including one or more symbols, where each symbol may include the sequence for the DMRS, the truncated sequence, and the data, as described with reference to FIGS. 3-6. In some cases, the network entity 105-*b* may output the sequence for the DMRS at a sequentially last position of the signal in the time domain after a last symbol as described with reference to the new DMRS copy 540 added in the time domain in FIG. 5. In some cases, the network entity 105-*b* may output the truncated sequence and the sequence for the DMRS included in an extended cyclic prefix of the signal in the time domain as described with reference to the extended cyclic prefix 635 in FIG. 6.

At 735, the UE 115-*b* may apply a Fourier transform on the received signal in the time domain to generate a mapping of the DMRS the data in the delay-Doppler domain. For example, the UE 115-*b* may apply one or more IFFTs, DFTS, or SFFTs, or any combination thereof, to convert the mapped DMRS, truncated sequence, and data to the time-frequency domain, to the time-delay domain, and to the delay-Doppler domain as described with reference to FIG. 2. In some examples, the UE 115-*b* may apply one or more FFTs to generate a delay-Doppler matrix using a simplified conversion process as described with reference to FIG. 2.

In some examples, the UE 115-*b* may identify the mapping of the sequence for the DMRS and the truncated sequence to the continuous set of resources in the delay domain of the delay-Doppler domain. In some cases, the UE 115-*b* may identify the mapping of the sequence for the DMRS to the first position corresponding to the first set of consecutive delay values in the delay domain of the delay-Doppler domain and the mapping of the truncated sequence to the second position corresponding to the second set of consecutive delay values in the delay domain of the delay-Doppler domain. In some examples, the UE 115-*b* may identify the mapping of the data to the third position in the delay domain of the delay-Doppler domain.

At 740, the UE 115-*b* may perform a channel estimation based on applying the Fourier transform on the received signal. For example, the UE 115-*b* may use one or more circular convolutions, thresholds, interpolations, or extrapolations to estimate a channel as described with reference to FIG. 2. In some examples, the UE 115-*b* may estimate a delay channel at one or more Doppler values of the delay-Doppler domain based on receiving the signal in the time domain. In some cases, the UE 115-*b* may apply a threshold to the estimated delay channel to generate a Doppler domain channel and may apply an IFFT on the Doppler domain channel. In some examples, performing the channel estimation may be based on estimating the delay channel and applying the IFFT on the Doppler domain channel. Additionally, or alternatively, in some examples, performing the channel estimation may be based on identifying the mapping of the sequence for the DMRS and the truncated sequence to the continuous set of resources in the delay domain of the delay-Doppler domain and to the first and second sets of consecutive delay values corresponding to the first and second positions in the delay domain of the delay-Doppler domain.

Figure 8:
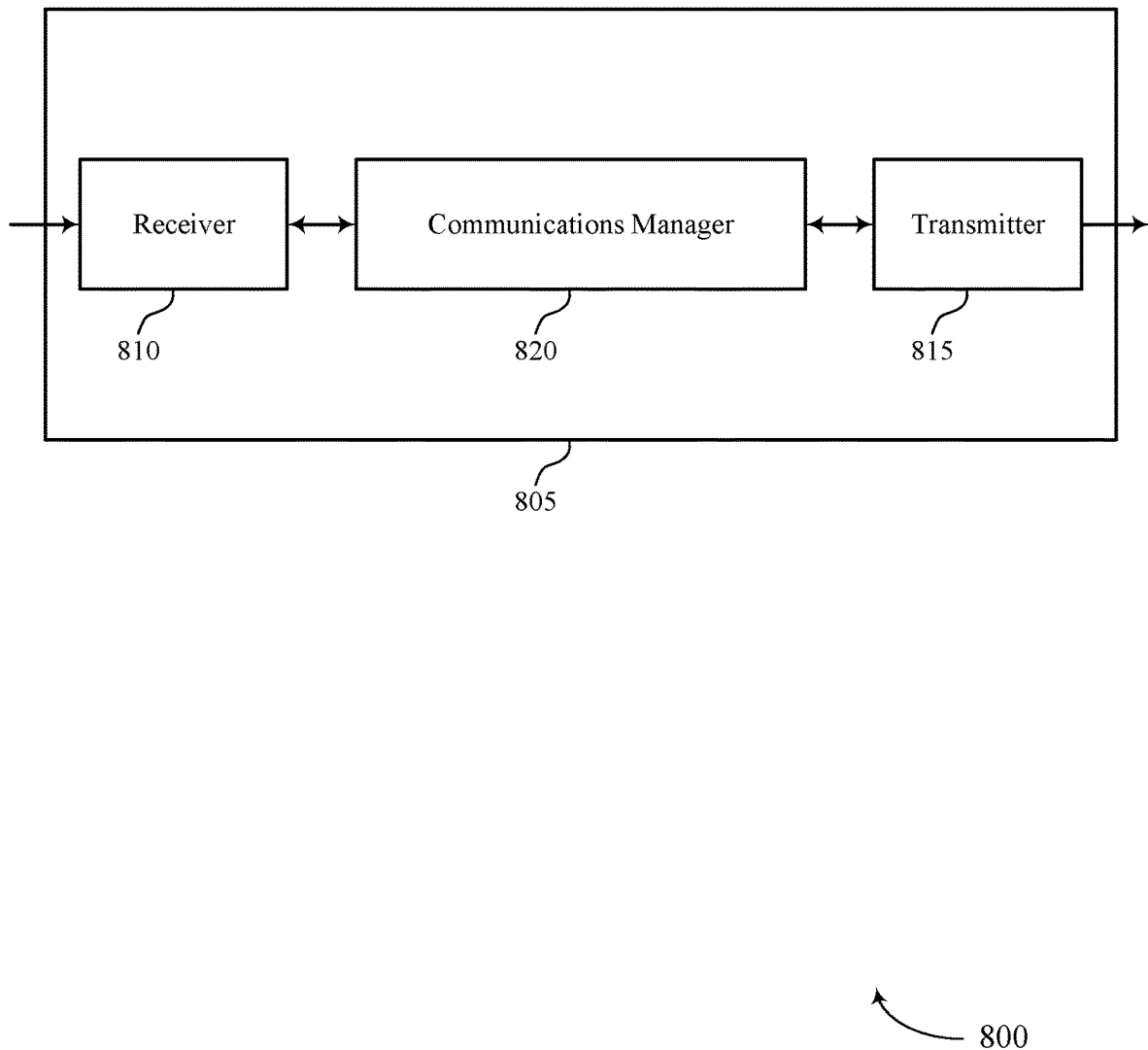
FIGS. 8 and 9 show block diagrams of devices that support multiplexing DMRS and data in OTFS waveform in accordance with one or more aspects of the present disclosure.

FIG. 8 shows a block diagram 800 of a device 805 that supports multiplexing DMRS and data in OTFS waveform in accordance with one or more aspects of the present disclosure. The device 805 may be an example of aspects of a UE 115 as described herein. The device 805 may include a receiver 810, a transmitter 815, and a communications manager 820. The device 805 may also include one or more processors, memory coupled with the one or more processors, and instructions stored in the memory that are executable by the one or more processors to enable the one or more processors to perform the DMRS multiplexing features discussed herein. Each of these components may be in communication with one another (e.g., via one or more buses).

The receiver 810 may provide a means for receiving information such as packets, user data, control information, or any combination thereof associated with various information channels (e.g., control channels, data channels, information channels related to multiplexing DMRS and data in OTFS waveform). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to multiplexing DMRS and data in OTFS waveform). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of multiplexing DMRS and data in OTFS waveform as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. For example, the communications manager 820 may be configured as or otherwise support a means for receiving a control signal indicating a position of a transmission of a DMRS and a sequence for the DMRS in a delay-Doppler domain. The communications manager 820 may be configured as or otherwise support a means for receiving a signal in time domain, the signal including the sequence for the DMRS, a truncated sequence, and data. The communications manager 820 may be configured as or otherwise support a means for applying a Fourier transform on the received signal in the time domain to generate a mapping of the DMRS and the data in the delay-Doppler domain. The communications manager 820 may be configured as or otherwise support a means for performing a channel estimation based on applying the Fourier transform on the received signal.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced power consumption and more efficient utilization of communication resources.

Figure 9:
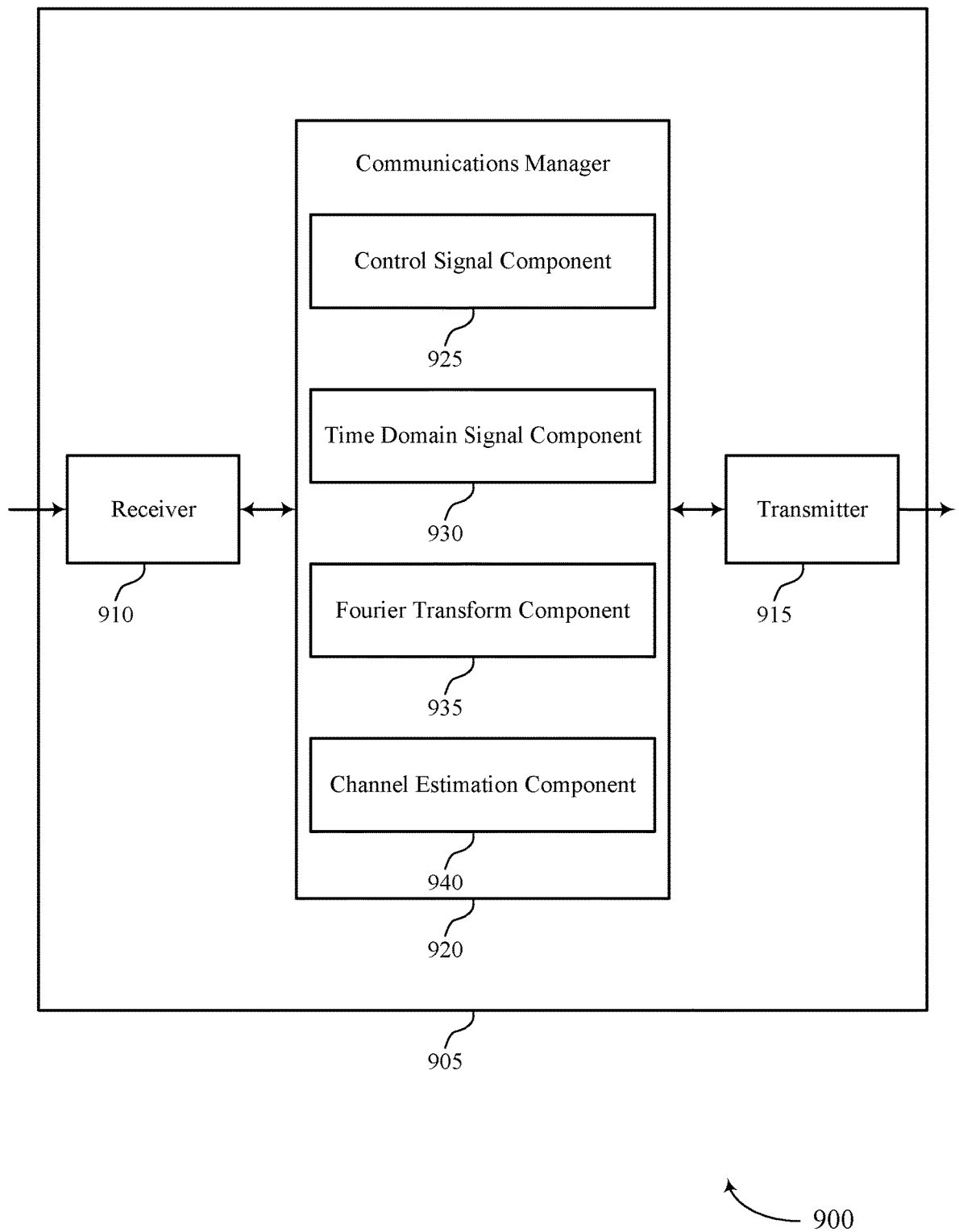

FIG. 9 shows a block diagram 900 of a device 905 that supports multiplexing DMRS and data in OTFS waveform in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to multiplexing DMRS and data in OTFS waveform). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to multiplexing DMRS and data in OTFS waveform). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of multiplexing DMRS and data in OTFS waveform as described herein. For example, the communications manager 920 may include a control signal component 925, a time domain signal component 930, a Fourier transform component 935, a channel estimation component 940, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. The control signal component 925 may be configured as or otherwise support a means for receiving a control signal indicating a position of a transmission of a DMRS and a sequence for the DMRS in a delay-Doppler domain. The time domain signal component 930 may be configured as or otherwise support a means for receiving a signal in time domain, the signal including the sequence for the DMRS, a truncated sequence, and data. The Fourier transform component 935 may be configured as or otherwise support a means for applying a Fourier transform on the received signal in the time domain to generate a mapping of the DMRS and the data in the delay-Doppler domain. The channel estimation component 940 may be configured as or otherwise support a means for performing a channel estimation based on applying the Fourier transform on the received signal.

In some cases, the control signal component 925, the time domain signal component 930, the Fourier transform component 935, and the channel estimation component 940 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control signal component 925, the time domain signal component 930, the Fourier transform component 935, and the channel estimation component 940 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 10:
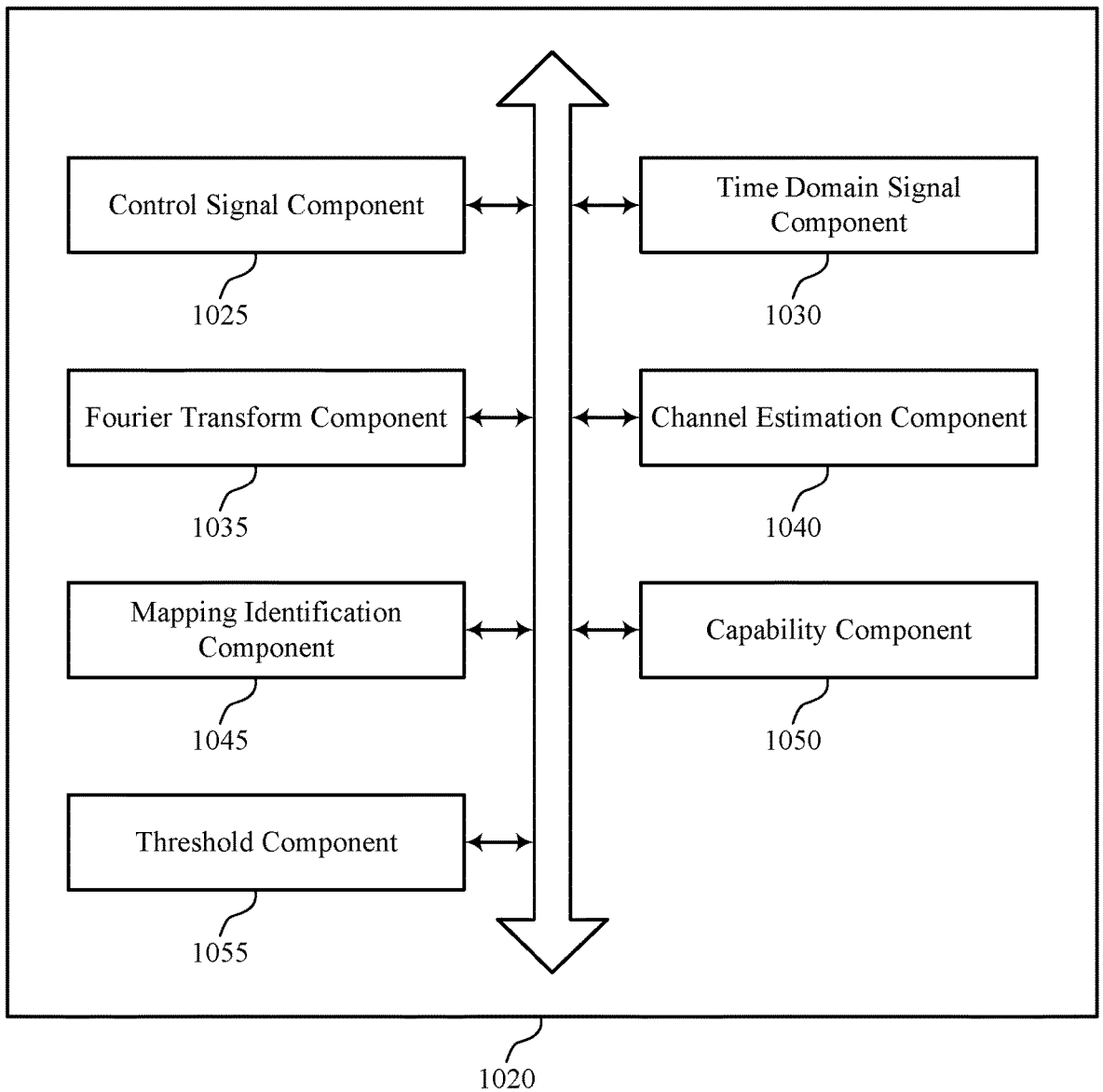
FIG. 10 shows a block diagram of a communications manager that supports multiplexing DMRS and data in OTFS waveform in accordance with one or more aspects of the present disclosure.

FIG. 10 shows a block diagram 1000 of a communications manager 1020 that supports multiplexing DMRS and data in OTFS waveform in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of multiplexing DMRS and data in OTFS waveform as described herein. For example, the communications manager 1020 may include a control signal component 1025, a time domain signal component 1030, a Fourier transform component 1035, a channel estimation component 1040, a mapping identification component 1045, a capability component 1050, a threshold component 1055, or any combination thereof. Each of these components may communicate, directly or indirectly, with one another (e.g., via one or more buses).

The communications manager 1020 may support wireless communication at a UE in accordance with examples as disclosed herein. The control signal component 1025 may be configured as or otherwise support a means for receiving a control signal indicating a position of a transmission of a DMRS and a sequence for the DMRS in a delay-Doppler domain. The time domain signal component 1030 may be configured as or otherwise support a means for receiving a signal in time domain, the signal including the sequence for the DMRS, a truncated sequence, and data. The Fourier transform component 1035 may be configured as or otherwise support a means for applying a Fourier transform on the received signal in the time domain to generate a mapping of the DMRS and the data in the delay-Doppler domain. The channel estimation component 1040 may be configured as or otherwise support a means for performing a channel estimation based on applying the Fourier transform on the received signal.

In some examples, the mapping identification component 1045 may be configured as or otherwise support a means for identifying a mapping of the sequence for the DMRS and the truncated sequence to a continuous set of resources in a delay domain of the delay-Doppler domain for one or more consecutive Doppler values of the delay-Doppler domain, where performing the channel estimation is based on identifying the mapping of the sequence for the DMRS and the truncated sequence, and where the DMRS and the truncated sequence include a non-zero value for at least one Doppler value of the one or more consecutive Doppler values.

In some examples, the channel estimation component 1040 may be configured as or otherwise support a means for estimating a delay channel at one or more Doppler values of the delay-Doppler domain based on receiving the signal in the time domain, where performing the channel estimation is based on estimating the delay channel.

In some examples, the threshold component 1055 may be configured as or otherwise support a means for applying a threshold to the estimated delay channel to generate a Doppler domain channel. In some examples, the Fourier transform component 1035 may be configured as or otherwise support a means for applying an IFFT on the Doppler domain channel, where performing the channel estimation is based on applying the IFFT.

In some examples, the mapping identification component 1045 may be configured as or otherwise support a means for identifying a mapping of the sequence for the DMRS to a first position corresponding to a first set of consecutive delay values in a delay domain of the delay-Doppler domain for one or more Doppler values of the delay-Doppler domain. In some examples, the mapping identification component 1045 may be configured as or otherwise support a means for identifying a mapping of the truncated sequence to a second position corresponding to a second set of consecutive delay values in the delay domain of the delay-Doppler domain for the one or more Doppler values of the delay-Doppler domain, where performing the channel estimation is based on identifying the mapping of the sequence for the DMRS and the truncated sequence.

In some examples, the first position follows the second position based on a circular association between a set of multiple positions in the delay domain of the delay-Doppler domain. In some examples, the second position follows the first position based on a circular association between a set of multiple positions in the delay domain of the delay-Doppler domain.

In some examples, the mapping identification component 1045 may be configured as or otherwise support a means for identifying a mapping of the data to a third position in the delay domain of the delay-Doppler domain, where the third position is different from the first position and the second position. In some examples, the capability component 1050 may be configured as or otherwise support a means for transmitting a capability to support reception of the sequence for the DMRS at a sequentially last position of the signal in the time domain or included in an extended cyclic prefix.

In some examples, a length of the sequence for the DMRS in a delay domain of the delay-Doppler domain is based on a maximum delay spread and a bandwidth. In some examples, a length of the sequence for the DMRS in a Doppler domain of the delay-Doppler domain is based on a maximum Doppler value and a total duration of an orthogonal time frequency and space waveform. In some examples, the sequence for the DMRS includes a set of input samples and the truncated sequence includes a subset of the set of input samples. In some examples, the sequence for the DMRS and the truncated sequence include Zadoff-Chu sequences.

In some cases, the control signal component 1025, the time domain signal component 1030, the Fourier transform component 1035, the channel estimation component 1040, the mapping identification component 1045, the capability component 1050, and the threshold component 1055 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control signal component 1025, the time domain signal component 1030, the Fourier transform component 1035, the channel estimation component 1040, the mapping identification component 1045, the capability component 1050, and the threshold component 1055 discussed herein.

Figure 11:
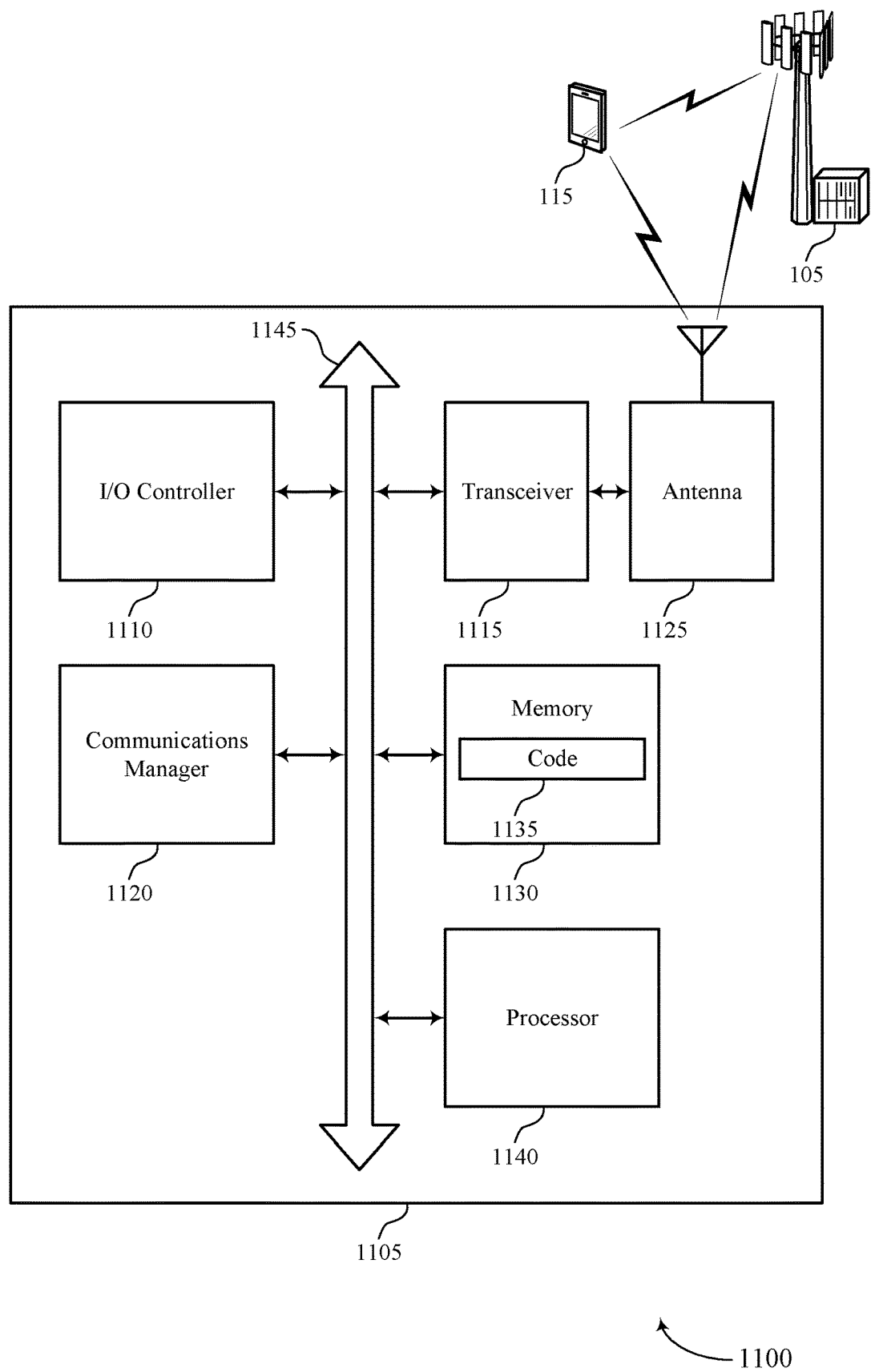
FIG. 11 shows a diagram of a system including a device that supports multiplexing DMRS and data in OTFS waveform in accordance with one or more aspects of the present disclosure.

FIG. 11 shows a diagram of a system 1100 including a device 1105 that supports multiplexing DMRS and data in OTFS waveform in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting multiplexing DMRS and data in OTFS waveform). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving a control signal indicating a position of a transmission of a DMRS and a sequence for the DMRS in a delay-Doppler domain. The communications manager 1120 may be configured as or otherwise support a means for receiving a signal in time domain, the signal including the sequence for the DMRS, a truncated sequence, and data. The communications manager 1120 may be configured as or otherwise support a means for applying a Fourier transform on the received signal in the time domain to generate a mapping of the DMRS and the data in the delay-Doppler domain. The communications manager 1120 may be configured as or otherwise support a means for performing a channel estimation based on applying the Fourier transform on the received signal.

By including or configuring the communications manager 1120 in accordance with examples as described herein, the device 1105 may support techniques for reduced power consumption (e.g., lower PAPR), more efficient utilization of communication resources, longer battery life, and improved accuracy in channel estimation.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of multiplexing DMRS and data in OTFS waveform as described herein, or the processor 1140 and the memory 1130 may be otherwise configured to perform or support such operations.

Figure 12:
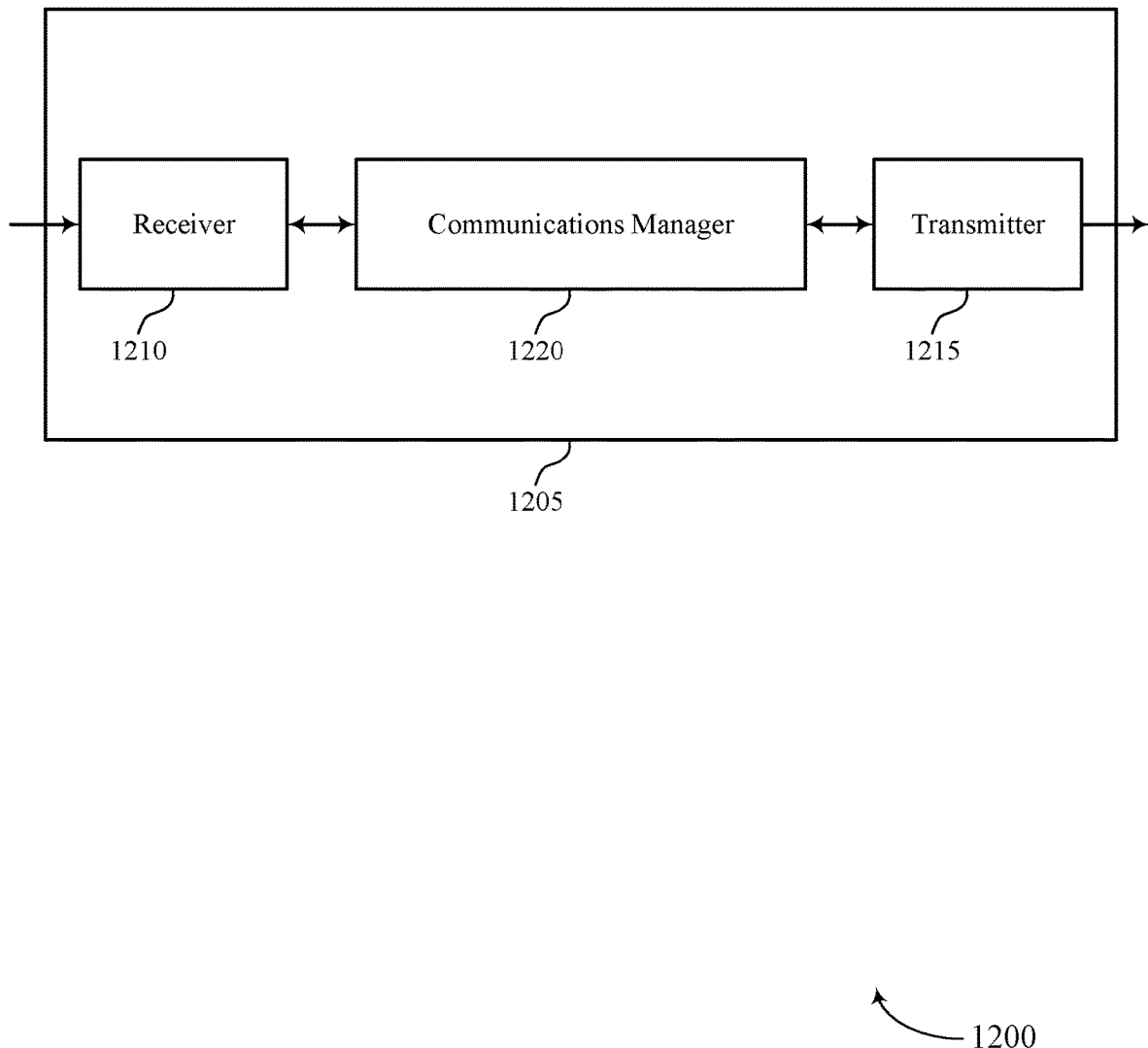
FIGS. 12 and 13 show block diagrams of devices that support multiplexing DMRS and data in OTFS waveform in accordance with one or more aspects of the present disclosure.

FIG. 12 shows a block diagram 1200 of a device 1205 that supports multiplexing DMRS and data in OTFS waveform in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include one or more processors, memory coupled with the one or more processors, and instructions stored in the memory that are executable by the one or more processors to enable the one or more processors to perform the DMRS multiplexing features discussed herein. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of multiplexing DMRS and data in OTFS waveform as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity in accordance with examples as disclosed herein. For example, the communications manager 1220 may be configured as or otherwise support a means for outputting a control signal indicating a position of a DMRS transmission and a sequence for the DMRS in a delay-Doppler domain. The communications manager 1220 may be configured as or otherwise support a means for mapping the DMRS, a truncated sequence and data in the delay-Doppler domain in accordance with the control signal. The communications manager 1220 may be configured as or otherwise support a means for applying a Fourier transform on the mapped DMRS, the truncated sequence and the data to generate a signal in time domain. The communications manager 1220 may be configured as or otherwise support a means for outputting the signal in the time domain, the signal including the sequence for the DMRS, the truncated sequence, and the data.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for reduced power consumption and more efficient utilization of communication resources.

Figure 13:
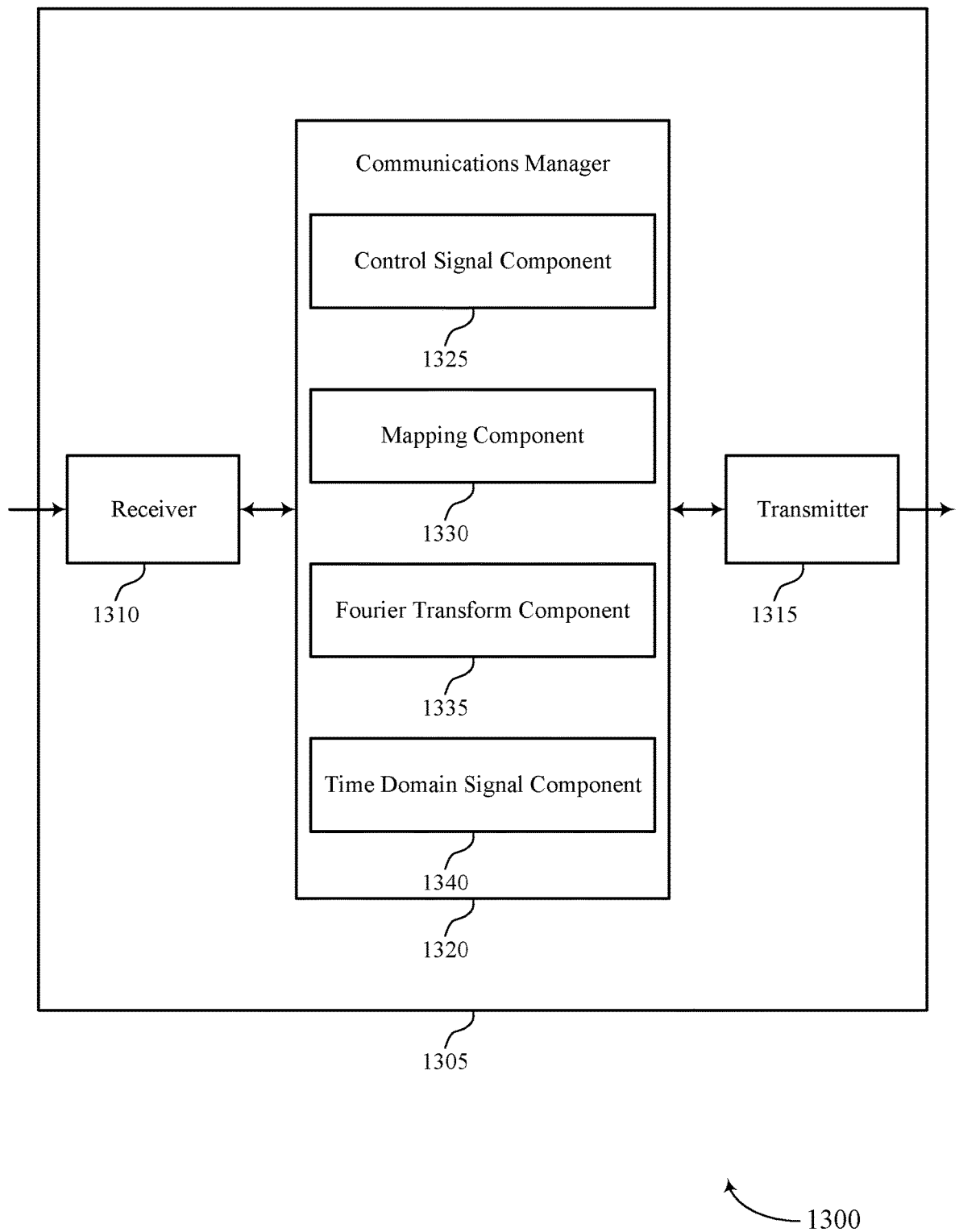

FIG. 13 shows a block diagram 1300 of a device 1305 that supports multiplexing DMRS and data in OTFS waveform in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of multiplexing DMRS and data in OTFS waveform as described herein. For example, the communications manager 1320 may include a control signal component 1325, a mapping component 1330, a Fourier transform component 1335, a time domain signal component 1340, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a network entity in accordance with examples as disclosed herein. The control signal component 1325 may be configured as or otherwise support a means for outputting a control signal indicating a position of a DMRS transmission and a sequence for the DMRS in a delay-Doppler domain. The mapping component 1330 may be configured as or otherwise support a means for mapping the DMRS, a truncated sequence and data in the delay-Doppler domain in accordance with the control signal. The Fourier transform component 1335 may be configured as or otherwise support a means for applying a Fourier transform on the mapped DMRS, the truncated sequence and the data to generate a signal in time domain. The time domain signal component 1340 may be configured as or otherwise support a means for outputting the signal in the time domain, the signal including the sequence for the DMRS, the truncated sequence, and the data.

In some cases, the control signal component 1325, the mapping component 1330, the Fourier transform component 1335, and the time domain signal component 1340 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control signal component 1325, the mapping component 1330, the Fourier transform component 1335, and the time domain signal component 1340 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 14:
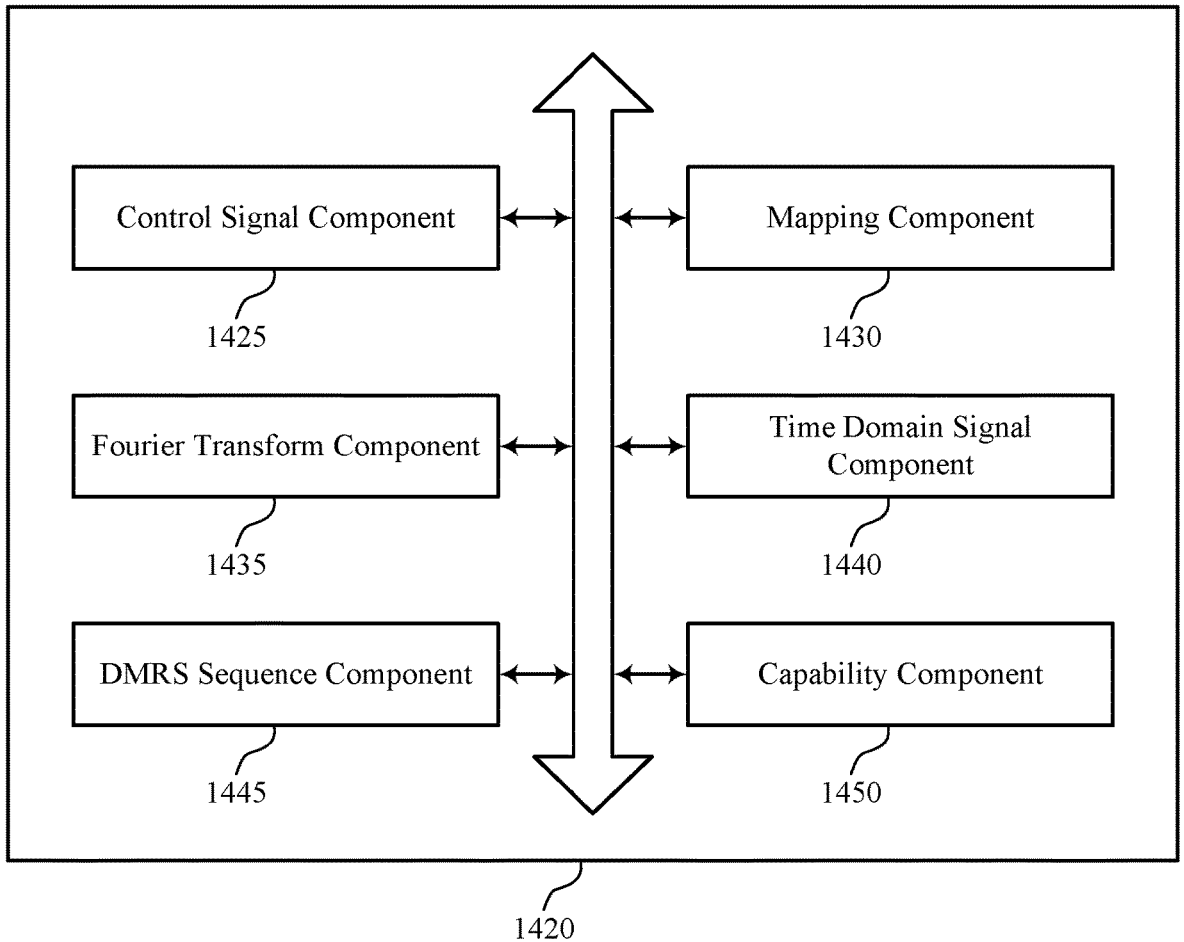
FIG. 14 shows a block diagram of a communications manager that supports multiplexing DMRS and data in OTFS waveform in accordance with one or more aspects of the present disclosure.

FIG. 14 shows a block diagram 1400 of a communications manager 1420 that supports multiplexing DMRS and data in OTFS waveform in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of multiplexing DMRS and data in OTFS waveform as described herein. For example, the communications manager 1420 may include a control signal component 1425, a mapping component 1430, a Fourier transform component 1435, a time domain signal component 1440, a DMRS sequence component 1445, a capability component 1450, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communication at a network entity in accordance with examples as disclosed herein. The control signal component 1425 may be configured as or otherwise support a means for outputting a control signal indicating a position of a DMRS transmission and a sequence for the DMRS in a delay-Doppler domain. The mapping component 1430 may be configured as or otherwise support a means for mapping the DMRS, a truncated sequence and data in the delay-Doppler domain in accordance with the control signal. The Fourier transform component 1435 may be configured as or otherwise support a means for applying a Fourier transform on the mapped DMRS, the truncated sequence and the data to generate a signal in time domain. The time domain signal component 1440 may be configured as or otherwise support a means for outputting the signal in the time domain, the signal including the sequence for the DMRS, the truncated sequence, and the data.

In some examples, the mapping component 1430 may be configured as or otherwise support a means for mapping the sequence for the DMRS and the truncated sequence to a continuous set of resources in a delay domain of the delay-Doppler domain for one or more consecutive Doppler values of the delay-Doppler domain, where applying the Fourier transform is based on mapping the sequence for the DMRS and the truncated sequence, and where the DMRS and the truncated sequence include a non-zero value for at least one Doppler value of the one or more consecutive Doppler values.

In some examples, the DMRS sequence component 1445 may be configured as or otherwise support a means for determining the sequence for the DMRS based on an operating modulation and coding scheme and a signal to noise ratio value. In some examples, to support outputting the signal, the time domain signal component 1440 may be configured as or otherwise support a means for outputting the sequence for the DMRS at a sequentially last position of the signal in the time domain. In some examples, to support outputting the signal, the time domain signal component 1440 may be configured as or otherwise support a means for outputting the truncated sequence and the sequence for the DMRS included in an extended cyclic prefix of the signal in the time domain.

In some examples, the mapping component 1430 may be configured as or otherwise support a means for mapping the sequence for the DMRS to a first position corresponding to a first set of consecutive delay values in a delay domain of the delay-Doppler domain for one or more Doppler values of the delay-Doppler domain. In some examples, the mapping component 1430 may be configured as or otherwise support a means for mapping the truncated sequence to a second position corresponding to a second set of consecutive delay values in the delay domain of the delay-Doppler domain for the one or more Doppler values of the delay-Doppler domain, where applying the Fourier transform is based on mapping the sequence for the DMRS and the truncated sequence.

In some examples, the first position follows the second position based on a circular association between a set of multiple positions in the delay domain of the delay-Doppler domain. In some examples, the second position follows the first position based on a circular association between a set of multiple positions in the delay domain of the delay-Doppler domain.

In some examples, the mapping component 1430 may be configured as or otherwise support a means for mapping the data to a third position in the delay domain of the delay-Doppler domain, where the third position is different from the first position and the second position.

In some examples, the capability component 1450 may be configured as or otherwise support a means for obtaining a capability to support reception of the sequence for the DMRS at a sequentially last position of the signal in the time domain or included in an extended cyclic prefix, where the mapping is based on obtaining the capability.

In some examples, a length of the sequence for the DMRS in a delay domain of the delay-Doppler domain is based on a maximum delay spread and a bandwidth. In some examples, a length of the sequence for the DMRS in a Doppler domain of the delay-Doppler domain is based on a maximum Doppler value and a total duration of an orthogonal time frequency and space waveform. In some examples, the sequence for the DMRS includes a set of input samples and the truncated sequence includes a subset of the set of input samples. In some examples, the sequence for the DMRS and the truncated sequence include Zadoff-Chu sequences.

In some cases, the control signal component 1425, the mapping component 1430, the Fourier transform component 1435, the time domain signal component 1440, the DMRS sequence component 1445, and the capability component 1450 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control signal component 1425, the mapping component 1430, the Fourier transform component 1435, the time domain signal component 1440, the DMRS sequence component 1445, and the capability component 1450 discussed herein.

Figure 15:
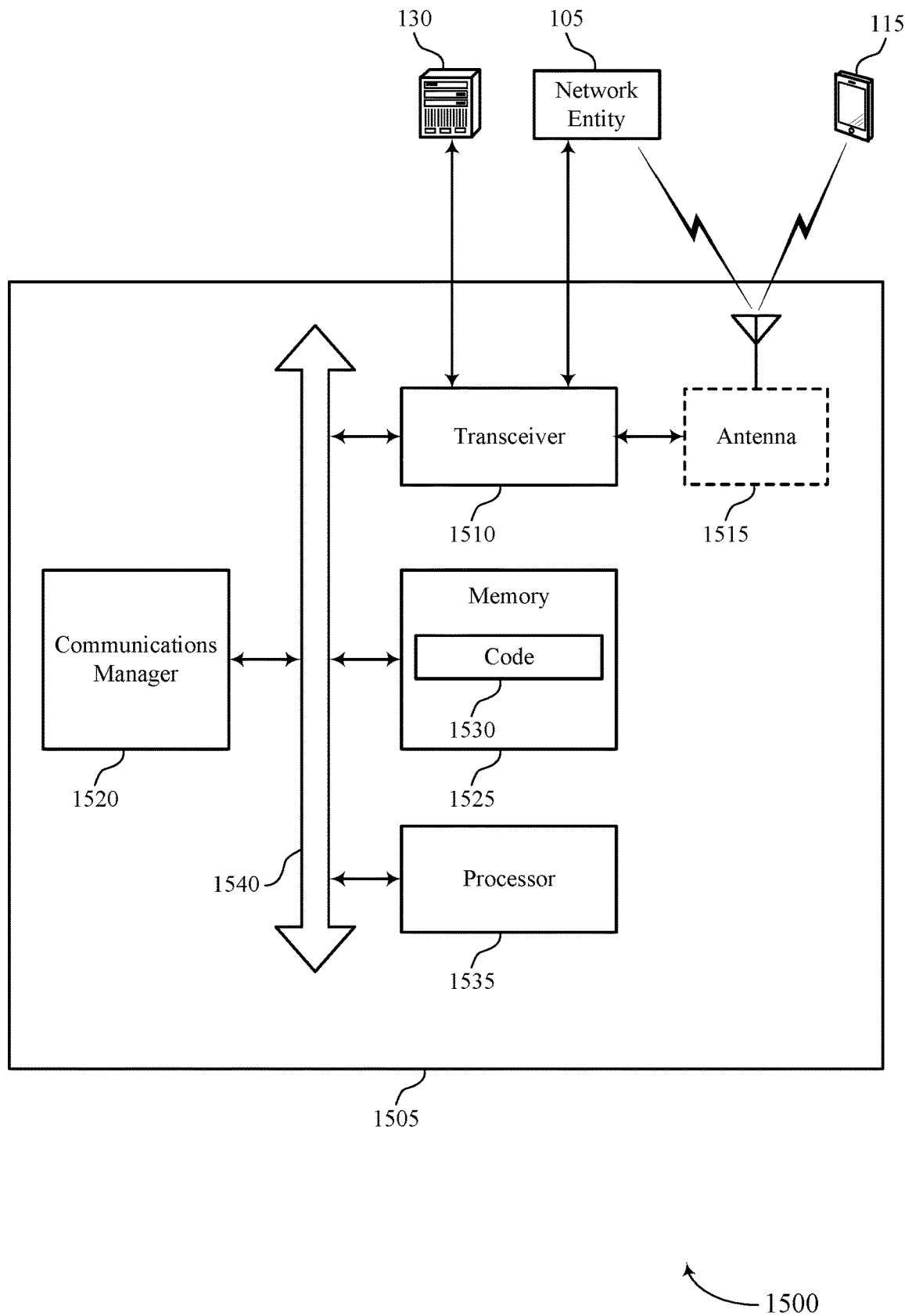
FIG. 15 shows a diagram of a system including a device that supports multiplexing DMRS and data in OTFS waveform in accordance with one or more aspects of the present disclosure.

FIG. 15 shows a diagram of a system 1500 including a device 1505 that supports multiplexing DMRS and data in OTFS waveform in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. The transceiver 1510, or the transceiver 1510 and one or more antennas 1515 or wired interfaces, where applicable, may be an example of a transmitter 1215, a transmitter 1315, a receiver 1210, a receiver 1310, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting multiplexing DMRS and data in OTFS waveform). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communication at a network entity in accordance with examples as disclosed herein. For example, the communications manager 1520 may be configured as or otherwise support a means for outputting a control signal indicating a position of a DMRS transmission and a sequence for the DMRS in a delay-Doppler domain. The communications manager 1520 may be configured as or otherwise support a means for mapping the DMRS, a truncated sequence and data in the delay-Doppler domain in accordance with the control signal. The communications manager 1520 may be configured as or otherwise support a means for applying a Fourier transform on the mapped DMRS, the truncated sequence and the data to generate a signal in time domain. The communications manager 1520 may be configured as or otherwise support a means for outputting the signal in the time domain, the signal including the sequence for the DMRS, the truncated sequence, and the data.

By including or configuring the communications manager 1520 in accordance with examples as described herein, the device 1505 may support techniques for reduced power consumption (e.g., lower PAPR), more efficient utilization of communication resources, longer battery life, and improved accuracy in channel estimation.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the processor 1535, the memory 1525, the code 1530, the transceiver 1510, or any combination thereof. For example, the code 1530 may include instructions executable by the processor 1535 to cause the device 1505 to perform various aspects of multiplexing DMRS and data in OTFS waveform as described herein, or the processor 1535 and the memory 1525 may be otherwise configured to perform or support such operations.

Figure 16:
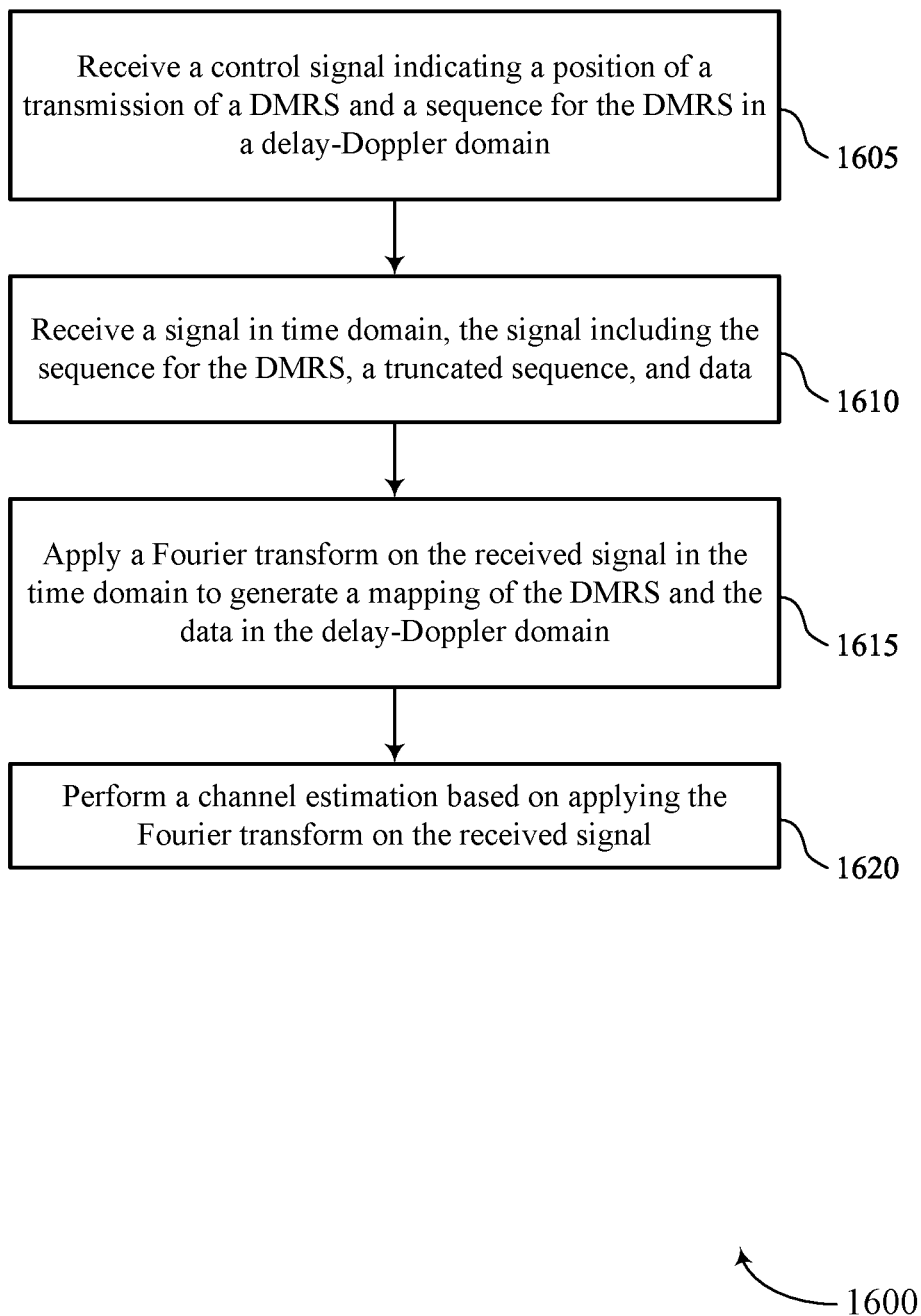
FIGS. 16 through 20 show flowcharts illustrating methods that support multiplexing DMRS and data in OTFS waveform in accordance with one or more aspects of the present disclosure.

FIG. 16 shows a flowchart illustrating a method 1600 that supports multiplexing DMRS and data in OTFS waveform in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving a control signal indicating a position of a transmission of a DMRS and a sequence for the DMRS in a delay-Doppler domain. The operations of 1605 may be performed in accordance with examples as disclosed herein. In some examples, aspects of the operations of 1605 may be performed by a control signal component 1025 as described with reference to FIG. 10.

At 1610, the method may include receiving a signal in time domain, the signal including the sequence for the DMRS, a truncated sequence, and data. The operations of 1610 may be performed in accordance with examples as disclosed herein. In some examples, aspects of the operations of 1610 may be performed by a time domain signal component 1030 as described with reference to FIG. 10.

At 1615, the method may include applying a Fourier transform on the received signal in the time domain to generate a mapping of the DMRS and the data in the delay-Doppler domain. The operations of 1615 may be performed in accordance with examples as disclosed herein. In some examples, aspects of the operations of 1615 may be performed by a Fourier transform component 1035 as described with reference to FIG. 10.

At 1620, the method may include performing a channel estimation based on applying the Fourier transform on the received signal. The operations of 1620 may be performed in accordance with examples as disclosed herein. In some examples, aspects of the operations of 1620 may be performed by a channel estimation component 1040 as described with reference to FIG. 10.

Figure 17:
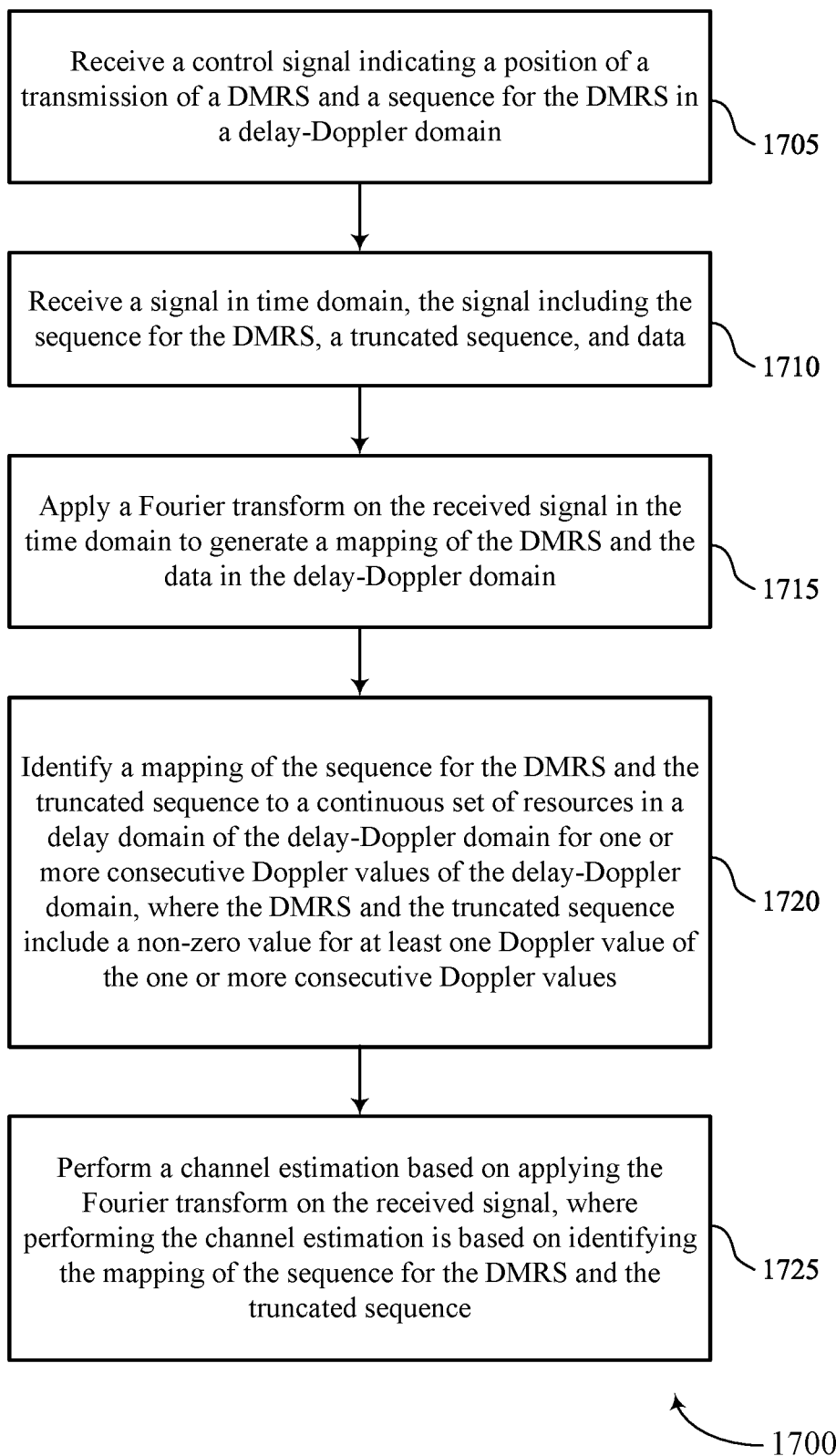

FIG. 17 shows a flowchart illustrating a method 1700 that supports multiplexing DMRS and data in OTFS waveform in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving a control signal indicating a position of a transmission of a DMRS and a sequence for the DMRS in a delay-Doppler domain. The operations of 1705 may be performed in accordance with examples as disclosed herein. In some examples, aspects of the operations of 1705 may be performed by a control signal component 1025 as described with reference to FIG. 10.

At 1710, the method may include receiving a signal in time domain, the signal including the sequence for the DMRS, a truncated sequence, and data. The operations of 1710 may be performed in accordance with examples as disclosed herein. In some examples, aspects of the operations of 1710 may be performed by a time domain signal component 1030 as described with reference to FIG. 10.

At 1715, the method may include applying a Fourier transform on the received signal in the time domain to generate a mapping of the DMRS and the data in the delay-Doppler domain. The operations of 1715 may be performed in accordance with examples as disclosed herein. In some examples, aspects of the operations of 1715 may be performed by a Fourier transform component 1035 as described with reference to FIG. 10.

At 1720, the method may include identifying a mapping of the sequence for the DMRS and the truncated sequence to a continuous set of resources in a delay domain of the delay-Doppler domain for one or more consecutive Doppler values of the delay-Doppler domain, where the DMRS and the truncated sequence include a non-zero value for at least one Doppler value of the one or more consecutive Doppler values. The operations of 1720 may be performed in accordance with examples as disclosed herein. In some examples, aspects of the operations of 1720 may be performed by a mapping identification component 1045 as described with reference to FIG. 10.

At 1725, the method may include performing a channel estimation based on applying the Fourier transform on the received signal, where performing the channel estimation is based on identifying the mapping of the sequence for the DMRS and the truncated sequence. The operations of 1725 may be performed in accordance with examples as disclosed herein. In some examples, aspects of the operations of 1725 may be performed by a channel estimation component 1040 as described with reference to FIG. 10.

Figure 18:
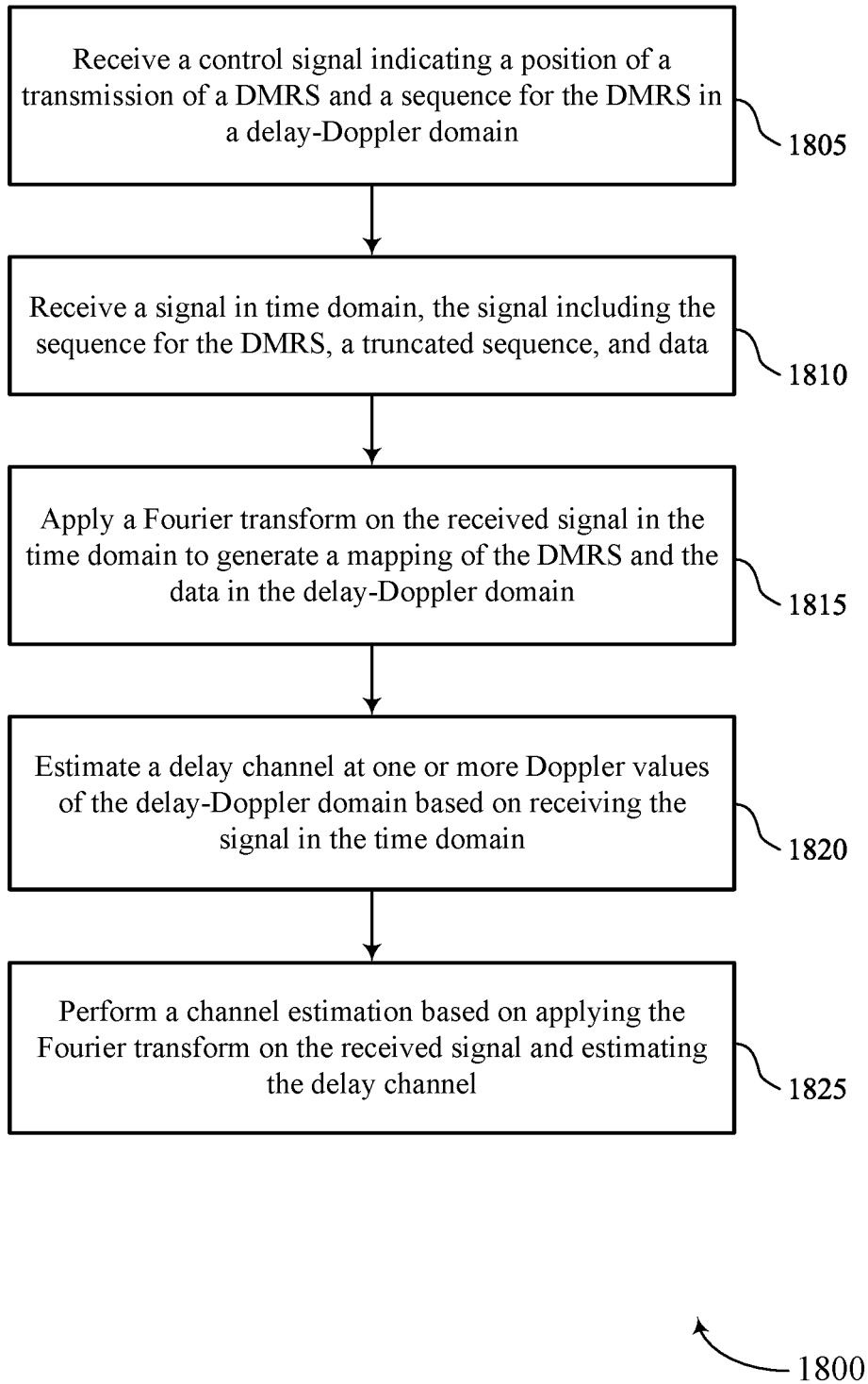

FIG. 18 shows a flowchart illustrating a method 1800 that supports multiplexing DMRS and data in OTFS waveform in accordance with one or more aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include receiving a control signal indicating a position of a transmission of a DMRS and a sequence for the DMRS in a delay-Doppler domain. The operations of 1805 may be performed in accordance with examples as disclosed herein. In some examples, aspects of the operations of 1805 may be performed by a control signal component 1025 as described with reference to FIG. 10.

At 1810, the method may include receiving a signal in time domain, the signal including the sequence for the DMRS, a truncated sequence, and data. The operations of 1810 may be performed in accordance with examples as disclosed herein. In some examples, aspects of the operations of 1810 may be performed by a time domain signal component 1030 as described with reference to FIG. 10.

At 1815, the method may include applying a Fourier transform on the received signal in the time domain to generate a mapping of the DMRS and the data in the delay-Doppler domain. The operations of 1815 may be performed in accordance with examples as disclosed herein. In some examples, aspects of the operations of 1815 may be performed by a Fourier transform component 1035 as described with reference to FIG. 10.

At 1820, the method may include estimating a delay channel at one or more Doppler values of the delay-Doppler domain based on receiving the signal in the time domain. The operations of 1820 may be performed in accordance with examples as disclosed herein. In some examples, aspects of the operations of 1820 may be performed by a channel estimation component 1040 as described with reference to FIG. 10.

At 1825, the method may include performing a channel estimation based on applying the Fourier transform on the received signal and estimating the delay channel. The operations of 1825 may be performed in accordance with examples as disclosed herein. In some examples, aspects of the operations of 1825 may be performed by a channel estimation component 1040 as described with reference to FIG. 10.

Figure 19:
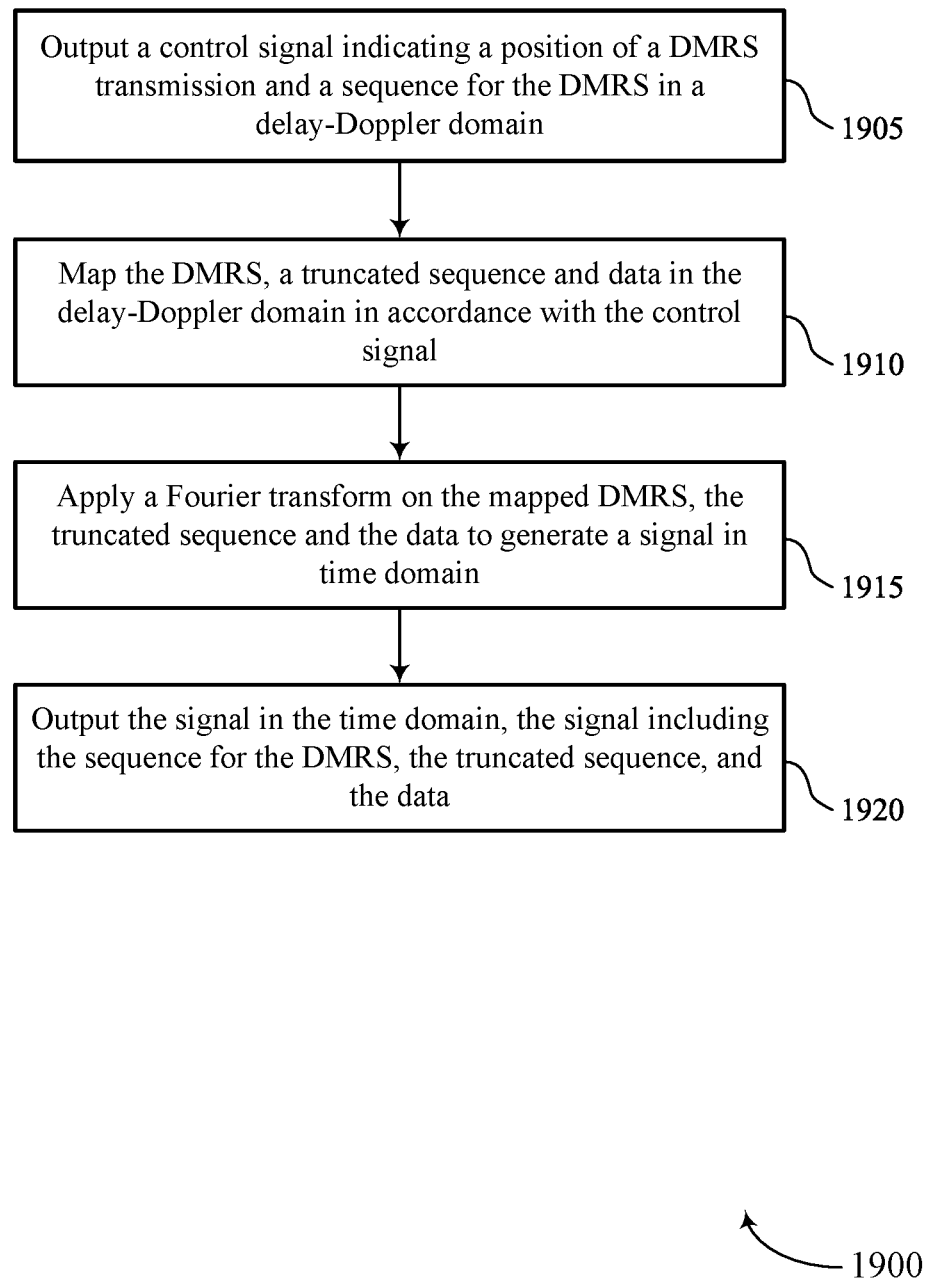

FIG. 19 shows a flowchart illustrating a method 1900 that supports multiplexing DMRS and data in OTFS waveform in accordance with one or more aspects of the present disclosure. The operations of the method 1900 may be implemented by a network entity or its components as described herein. For example, the operations of the method 1900 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1905, the method may include outputting a control signal indicating a position of a DMRS transmission and a sequence for the DMRS in a delay-Doppler domain. The operations of 1905 may be performed in accordance with examples as disclosed herein. In some examples, aspects of the operations of 1905 may be performed by a control signal component 1425 as described with reference to FIG. 14.

At 1910, the method may include mapping the DMRS, a truncated sequence and data in the delay-Doppler domain in accordance with the control signal. The operations of 1910 may be performed in accordance with examples as disclosed herein. In some examples, aspects of the operations of 1910 may be performed by a mapping component 1430 as described with reference to FIG. 14.

At 1915, the method may include applying a Fourier transform on the mapped DMRS, the truncated sequence and the data to generate a signal in time domain. The operations of 1915 may be performed in accordance with examples as disclosed herein. In some examples, aspects of the operations of 1915 may be performed by a Fourier transform component 1435 as described with reference to FIG. 14.

At 1920, the method may include outputting the signal in the time domain, the signal including the sequence for the DMRS, the truncated sequence, and the data. The operations of 1920 may be performed in accordance with examples as disclosed herein. In some examples, aspects of the operations of 1920 may be performed by a time domain signal component 1440 as described with reference to FIG. 14.

Figure 20:
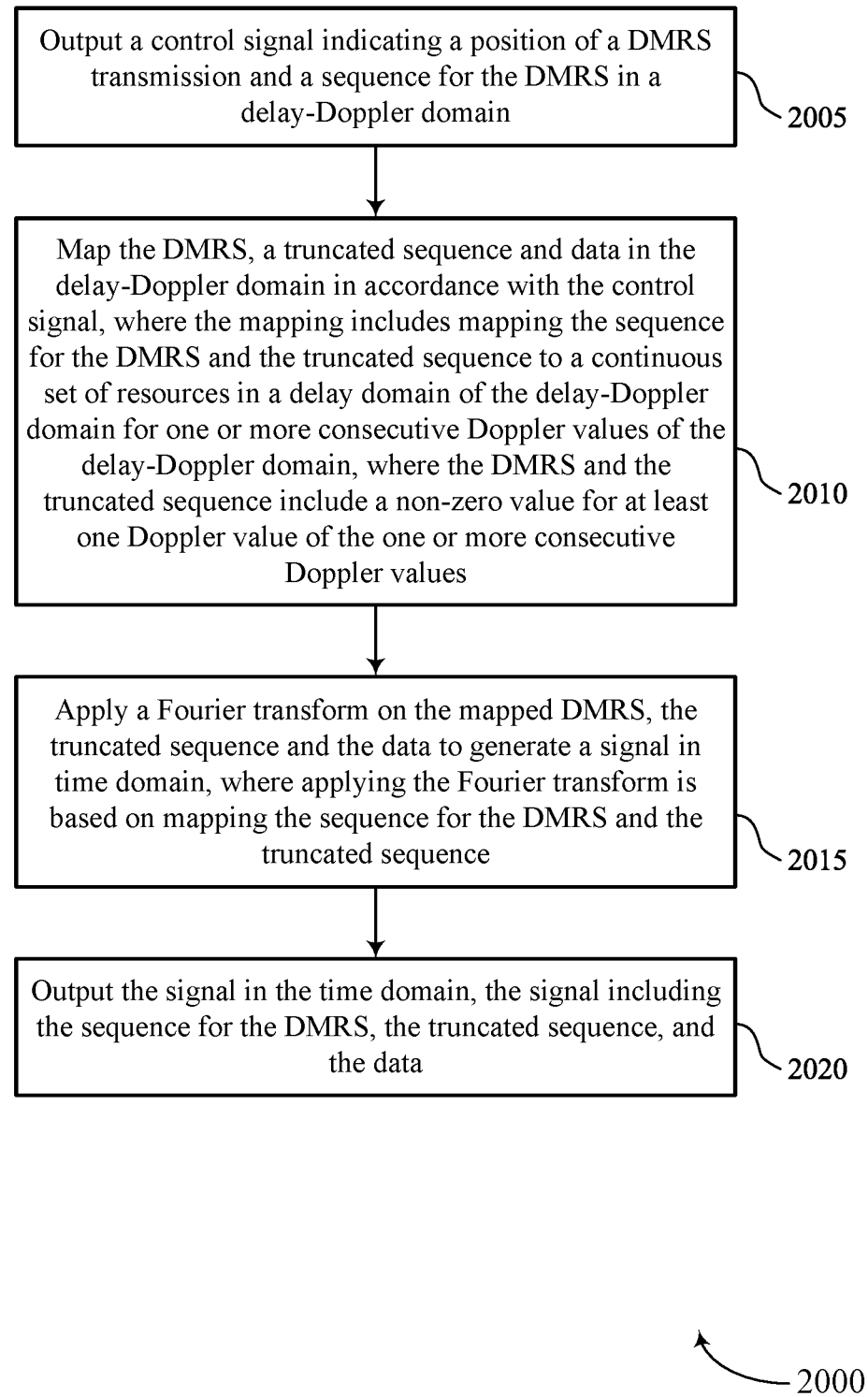

FIG. 20 shows a flowchart illustrating a method 2000 that supports multiplexing DMRS and data in OTFS waveform in accordance with one or more aspects of the present disclosure. The operations of the method 2000 may be implemented by a network entity or its components as described herein. For example, the operations of the method 2000 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2005, the method may include outputting a control signal indicating a position of a DMRS transmission and a sequence for the DMRS in a delay-Doppler domain. The operations of 2005 may be performed in accordance with examples as disclosed herein. In some examples, aspects of the operations of 2005 may be performed by a control signal component 1425 as described with reference to FIG. 14.

At 2010, the method may include mapping the DMRS, a truncated sequence and data in the delay-Doppler domain in accordance with the control signal, where the mapping includes mapping the sequence for the DMRS and the truncated sequence to a continuous set of resources in a delay domain of the delay-Doppler domain for one or more consecutive Doppler values of the delay-Doppler domain, where the DMRS and the truncated sequence include a non-zero value for at least one Doppler value of the one or more consecutive Doppler values. The operations of 2010 may be performed in accordance with examples as disclosed herein. In some examples, aspects of the operations of 2010 may be performed by a mapping component 1430 as described with reference to FIG. 14.

At 2015, the method may include applying a Fourier transform on the mapped DMRS, the truncated sequence and the data to generate a signal in time domain, where applying the Fourier transform is based on mapping the sequence for the DMRS and the truncated sequence. The operations of 2015 may be performed in accordance with examples as disclosed herein. In some examples, aspects of the operations of 2015 may be performed by a Fourier transform component 1435 as described with reference to FIG. 14.

At 2020, the method may include outputting the signal in the time domain, the signal including the sequence for the DMRS, the truncated sequence, and the data. The operations of 2020 may be performed in accordance with examples as disclosed herein. In some examples, aspects of the operations of 2020 may be performed by a time domain signal component 1440 as described with reference to FIG. 14.

The following provides an overview of aspects of the present disclosure:

Aspect 1: A method for wireless communication at a UE, comprising: receiving a control signal indicating a position of a transmission of a DMRS and a sequence for the DMRS in a delay-Doppler domain; receiving a signal in time domain, the signal comprising the sequence for the DMRS, a truncated sequence, and data; applying a Fourier transform on the received signal in the time domain to generate a mapping of the DMRS and the data in the delay-Doppler domain; and performing a channel estimation based at least in part on applying the Fourier transform on the received signal.

Aspect 2: The method of aspect 1, further comprising: identifying a mapping of the sequence for the DMRS and the truncated sequence to a continuous set of resources in a delay domain of the delay-Doppler domain for one or more consecutive Doppler values of the delay-Doppler domain, wherein performing the channel estimation is based at least in part on identifying the mapping of the sequence for the DMRS and the truncated sequence, and wherein the DMRS and the truncated sequence comprise a non-zero value for at least one Doppler value of the one or more consecutive Doppler values.

Aspect 3: The method of any of aspects 1 through 2, further comprising: estimating a delay channel at one or more Doppler values of the delay-Doppler domain based at least in part on receiving the signal in the time domain, wherein performing the channel estimation is based at least in part on estimating the delay channel.

Aspect 4: The method of aspect 3, further comprising: applying a threshold to the estimated delay channel to generate a Doppler domain channel; and applying an IFFT on the Doppler domain channel, wherein performing the channel estimation is based at least in part on applying the IFFT.

Aspect 5: The method of any of aspects 1 through 4, further comprising: identifying a mapping of the sequence for the DMRS to a first position corresponding to a first set of consecutive delay values in a delay domain of the delay-Doppler domain for one or more Doppler values of the delay-Doppler domain; and identifying a mapping of the truncated sequence to a second position corresponding to a second set of consecutive delay values in the delay domain of the delay-Doppler domain for the one or more Doppler values of the delay-Doppler domain, wherein performing the channel estimation is based at least in part on identifying the mapping of the sequence for the DMRS and the truncated sequence.

Aspect 6: The method of aspect 5, wherein the first position follows the second position based at least in part on a circular association between a plurality of positions in the delay domain of the delay-Doppler domain.

Aspect 7: The method of any of aspects 5 through 6, wherein the second position follows the first position based at least in part on a circular association between a plurality of positions in the delay domain of the delay-Doppler domain.

Aspect 8: The method of any of aspects 5 through 7, further comprising: identifying a mapping of the data to a third position in the delay domain of the delay-Doppler domain, wherein the third position is different from the first position and the second position.

Aspect 9: The method of any of aspects 1 through 8, further comprising: transmitting a capability to support reception of the sequence for the DMRS at a sequentially last position of the signal in the time domain or included in an extended cyclic prefix.

Aspect 10: The method of any of aspects 1 through 9, wherein a length of the sequence for the DMRS in a delay domain of the delay-Doppler domain is based at least in part on a maximum delay spread and a bandwidth.

Aspect 11: The method of any of aspects 1 through 10, wherein a length of the sequence for the DMRS in a Doppler domain of the delay-Doppler domain is based at least in part on a maximum Doppler value and a total duration of an orthogonal time frequency and space waveform.

Aspect 12: The method of any of aspects 1 through 11, wherein the sequence for the DMRS comprises a set of input samples and the truncated sequence comprises a subset of the set of input samples.

Aspect 13: The method of any of aspects 1 through 12, wherein the sequence for the DMRS and the truncated sequence comprise Zadoff-Chu sequences.

Aspect 14: A method for wireless communication at a network entity, comprising: outputting a control signal indicating a position of a DMRS transmission and a sequence for the DMRS in a delay-Doppler domain; mapping the DMRS, a truncated sequence and data in the delay-Doppler domain in accordance with the control signal; applying a Fourier transform on the mapped DMRS, the truncated sequence and the data to generate a signal in time domain; and outputting the signal in the time domain, the signal comprising the sequence for the DMRS, the truncated sequence, and the data.

Aspect 15: The method of aspect 14, further comprising: mapping the sequence for the DMRS and the truncated sequence to a continuous set of resources in a delay domain of the delay-Doppler domain for one or more consecutive Doppler values of the delay-Doppler domain, wherein applying the Fourier transform is based at least in part on mapping the sequence for the DMRS and the truncated sequence, and wherein the DMRS and the truncated sequence comprise a non-zero value for at least one Doppler value of the one or more consecutive Doppler values.

Aspect 16: The method of any of aspects 14 through 15, further comprising: determining the sequence for the DMRS based at least in part on an operating modulation and coding scheme and a signal to noise ratio value.

Aspect 17: The method of any of aspects 14 through 16, wherein outputting the signal comprises: outputting the sequence for the DMRS at a sequentially last position of the signal in the time domain.

Aspect 18: The method of any of aspects 14 through 17, wherein outputting the signal comprises: outputting the truncated sequence and the sequence for the DMRS included in an extended cyclic prefix of the signal in the time domain.

Aspect 19: The method of any of aspects 14 through 18, further comprising: mapping the sequence for the DMRS to a first position corresponding to a first set of consecutive delay values in a delay domain of the delay-Doppler domain for one or more Doppler values of the delay-Doppler domain; and mapping the truncated sequence to a second position corresponding to a second set of consecutive delay values in the delay domain of the delay-Doppler domain for the one or more Doppler values of the delay-Doppler domain, wherein applying the Fourier transform is based at least in part on mapping the sequence for the DMRS and the truncated sequence.

Aspect 20: The method of aspect 19, wherein the first position follows the second position based at least in part on a circular association between a plurality of positions in the delay domain of the delay-Doppler domain.

Aspect 21: The method of any of aspects 19 through 20, wherein the second position follows the first position based at least in part on a circular association between a plurality of positions in the delay domain of the delay-Doppler domain.

Aspect 22: The method of any of aspects 19 through 21, further comprising: mapping the data to a third position in the delay domain of the delay-Doppler domain, wherein the third position is different from the first position and the second position.

Aspect 23: The method of any of aspects 14 through 22, further comprising: obtaining a capability to support reception of the sequence for the DMRS at a sequentially last position of the signal in the time domain or included in an extended cyclic prefix, wherein the mapping is based at least in part on obtaining the capability.

Aspect 24: The method of any of aspects 14 through 23, wherein a length of the sequence for the DMRS in a delay domain of the delay-Doppler domain is based at least in part on a maximum delay spread and a bandwidth.

Aspect 25: The method of any of aspects 14 through 24, wherein a length of the sequence for the DMRS in a Doppler domain of the delay-Doppler domain is based at least in part on a maximum Doppler value and a total duration of an orthogonal time frequency and space waveform.

Aspect 26: The method of any of aspects 14 through 25, wherein the sequence for the DMRS comprises a set of input samples and the truncated sequence comprises a subset of the set of input samples.

Aspect 27: The method of any of aspects 14 through 26, wherein the sequence for the DMRS and the truncated sequence comprise Zadoff-Chu sequences Aspect 28: An apparatus for wireless communication at a UE, comprising a processor; memory coupled with the processor; and instructions stored in the memory and executable by the processor to cause the apparatus to perform a method of any of aspects 1 through 13.

Aspect 29: An apparatus for wireless communication at a UE, comprising at least one means for performing a method of any of aspects 1 through 13.

Aspect 30: A non-transitory computer-readable medium storing code for wireless communication at a UE, the code comprising instructions executable by a processor to perform a method of any of aspects 1 through 13.

Aspect 31: An apparatus for wireless communication at a network entity, comprising a processor; memory coupled with the processor; and instructions stored in the memory and executable by the processor to cause the apparatus to perform a method of any of aspects 14 through 27.

Aspect 32: An apparatus for wireless communication at a network entity, comprising at least one means for performing a method of any of aspects 14 through 27.

Aspect 33: A non-transitory computer-readable medium storing code for wireless communication at a network entity, the code comprising instructions executable by a processor to perform a method of any of aspects 14 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
    a processor;
    memory coupled with the processor; and
    instructions stored in the memory and executable by the processor to cause the apparatus to:
        receive a control signal indicating a position of a transmission of a demodulation reference signal and a sequence for the demodulation reference signal in a delay-Doppler domain;
        receive a signal in time domain, the signal comprising the sequence for the demodulation reference signal, a truncated sequence, and data;
        apply a Fourier transform on the received signal in the time domain to generate a mapping of the demodulation reference signal and the data in the delay-Doppler domain; and
        perform a channel estimation based at least in part on applying the Fourier transform on the received signal.

2. The apparatus of claim 1, wherein the instructions are further executable by the processor to cause the apparatus to:
    identify a mapping of the sequence for the demodulation reference signal and the truncated sequence to a continuous set of resources in a delay domain of the delay-Doppler domain for one or more consecutive Doppler values of the delay-Doppler domain, wherein performing the channel estimation is based at least in part on identifying the mapping of the sequence for the demodulation reference signal and the truncated sequence, and wherein the demodulation reference signal and the truncated sequence comprise a non-zero value for at least one Doppler value of the one or more consecutive Doppler values.

3. The apparatus of claim 1, wherein the instructions are further executable by the processor to cause the apparatus to:
    estimate a delay channel at one or more Doppler values of the delay-Doppler domain based at least in part on receiving the signal in the time domain, wherein performing the channel estimation is based at least in part on estimating the delay channel.

4. The apparatus of claim 3, wherein the instructions are further executable by the processor to cause the apparatus to:
    apply a threshold to the estimated delay channel to generate a Doppler domain channel; and apply an inverse fast Fourier transform on the Doppler domain channel, wherein performing the channel estimation is based at least in part on applying the inverse fast Fourier transform.

5. The apparatus of claim 1, wherein the instructions are further executable by the processor to cause the apparatus to:
identify a mapping of the sequence for the demodulation reference signal to a first position corresponding to a first set of consecutive delay values in a delay domain of the delay-Doppler domain for one or more Doppler values of the delay-Doppler domain; and
identify a mapping of the truncated sequence to a second position corresponding to a second set of consecutive delay values in the delay domain of the delay-Doppler domain for the one or more Doppler values of the delay-Doppler domain, wherein performing the channel estimation is based at least in part on identifying the mapping of the sequence for the demodulation reference signal and the truncated sequence.

6. The apparatus of claim 5, wherein the first position follows the second position based at least in part on a circular association between a plurality of positions in the delay domain of the delay-Doppler domain.

7. The apparatus of claim 5, wherein the second position follows the first position based at least in part on a circular association between a plurality of positions in the delay domain of the delay-Doppler domain.

8. The apparatus of claim 5, wherein the instructions are further executable by the processor to cause the apparatus to:
identify a mapping of the data to a third position in the delay domain of the delay-Doppler domain, wherein the third position is different from the first position and the second position.

9. The apparatus of claim 1, wherein the instructions are further executable by the processor to cause the apparatus to:
transmit a capability to support reception of the sequence for the demodulation reference signal at a sequentially last position of the signal in the time domain or included in an extended cyclic prefix.

10. The apparatus of claim 1, wherein a length of the sequence for the demodulation reference signal in a delay domain of the delay-Doppler domain is based at least in part on a maximum delay spread and a bandwidth.

11. The apparatus of claim 1, wherein a length of the sequence for the demodulation reference signal in a Doppler domain of the delay-Doppler domain is based at least in part on a maximum Doppler value and a total duration of an orthogonal time frequency and space waveform.

12. The apparatus of claim 1, wherein the sequence for the demodulation reference signal comprises a set of input samples and the truncated sequence comprises a subset of the set of input samples.

13. The apparatus of claim 1, wherein the sequence for the demodulation reference signal and the truncated sequence comprise Zadoff-Chu sequences.

14. An apparatus for wireless communication at a network entity, comprising:
a processor;
memory coupled with the processor; and
instructions stored in the memory and executable by the processor to cause the apparatus to:
output a control signal indicating a position of a demodulation reference signal transmission and a sequence for the demodulation reference signal in a delay-Doppler domain;
map the demodulation reference signal, a truncated sequence and data in the delay-Doppler domain in accordance with the control signal;
apply a Fourier transform on the mapped demodulation reference signal, the truncated sequence and the data to generate a signal in time domain; and
output the signal in the time domain, the signal comprising the sequence for the demodulation reference signal, the truncated sequence, and the data.

15. The apparatus of claim 14, wherein the instructions are further executable by the processor to cause the apparatus to:
map the sequence for the demodulation reference signal and the truncated sequence to a continuous set of resources in a delay domain of the delay-Doppler domain for one or more consecutive Doppler values of the delay-Doppler domain, wherein applying the Fourier transform is based at least in part on mapping the sequence for the demodulation reference signal and the truncated sequence, and wherein the demodulation reference signal and the truncated sequence comprise a non-zero value for at least one Doppler value of the one or more consecutive Doppler values.

16. The apparatus of claim 14, wherein the instructions are further executable by the processor to cause the apparatus to:
determine the sequence for the demodulation reference signal based at least in part on an operating modulation and coding scheme and a signal to noise ratio value.

17. The apparatus of claim 14, wherein the instructions to output the signal are executable by the processor to cause the apparatus to:
output the sequence for the demodulation reference signal at a sequentially last position of the signal in the time domain.

18. The apparatus of claim 14, wherein the instructions to output the signal are executable by the processor to cause the apparatus to:
output the truncated sequence and the sequence for the demodulation reference signal included in an extended cyclic prefix of the signal in the time domain.

19. The apparatus of claim 14, wherein the instructions are further executable by the processor to cause the apparatus to:
map the sequence for the demodulation reference signal to a first position corresponding to a first set of consecutive delay values in a delay domain of the delay-Doppler domain for one or more Doppler values of the delay-Doppler domain; and
map the truncated sequence to a second position corresponding to a second set of consecutive delay values in the delay domain of the delay-Doppler domain for the one or more Doppler values of the delay-Doppler domain, wherein applying the Fourier transform is based at least in part on mapping the sequence for the demodulation reference signal and the truncated sequence.

20. The apparatus of claim 19, wherein the first position follows the second position based at least in part on a circular association between a plurality of positions in the delay domain of the delay-Doppler domain.

21. The apparatus of claim 19, wherein the second position follows the first position based at least in part on a circular association between a plurality of positions in the delay domain of the delay-Doppler domain.

22. The apparatus of claim 19, wherein the instructions are further executable by the processor to cause the apparatus to:

map the data to a third position in the delay domain of the delay-Doppler domain, wherein the third position is different from the first position and the second position.

23. The apparatus of claim 14, wherein the instructions are further executable by the processor to cause the apparatus to:

obtain a capability to support reception of the sequence for the demodulation reference signal at a sequentially last position of the signal in the time domain or included in an extended cyclic prefix, wherein the mapping is based at least in part on obtaining the capability.

24. The apparatus of claim 14, wherein a length of the sequence for the demodulation reference signal in a delay domain of the delay-Doppler domain is based at least in part on a maximum delay spread and a bandwidth.

25. The apparatus of claim 14, wherein a length of the sequence for the demodulation reference signal in a Doppler domain of the delay-Doppler domain is based at least in part on a maximum Doppler value and a total duration of an orthogonal time frequency and space waveform.

26. The apparatus of claim 14, wherein the sequence for the demodulation reference signal comprises a set of input samples and the truncated sequence comprises a subset of the set of input samples.

27. The apparatus of claim 14, wherein the sequence for the demodulation reference signal and the truncated sequence comprise Zadoff-Chu sequences.

28. A method for wireless communication at a user equipment (UE), comprising:

receiving a control signal indicating a position of a transmission of a demodulation reference signal and a sequence for the demodulation reference signal in a delay-Doppler domain;

receiving a signal in time domain, the signal comprising the sequence for the demodulation reference signal, a truncated sequence, and data;

applying a Fourier transform on the received signal in the time domain to generate a mapping of the demodulation reference signal and the data in the delay-Doppler domain; and performing a channel estimation based at least in part on applying the Fourier transform on the received signal.

29. The method of claim 28, further comprising:

identifying a mapping of the sequence for the demodulation reference signal and the truncated sequence to a continuous set of resources in a delay domain of the delay-Doppler domain for one or more consecutive Doppler values of the delay-Doppler domain, wherein performing the channel estimation is based at least in part on identifying the mapping of the sequence for the demodulation reference signal and the truncated sequence, and wherein the demodulation reference signal and the truncated sequence comprise a non-zero value for at least one Doppler value of the one or more consecutive Doppler values.

30. A method for wireless communication at a network entity, comprising:

outputting a control signal indicating a position of a demodulation reference signal transmission and a sequence for the demodulation reference signal in a delay-Doppler domain;

mapping the demodulation reference signal, a truncated sequence and data in the delay-Doppler domain in accordance with the control signal;

applying a Fourier transform on the mapped demodulation reference signal, the truncated sequence and the data to generate a signal in time domain; and outputting the signal in the time domain, the signal comprising the sequence for the demodulation reference signal, the truncated sequence, and the data.

* * * * *